US009949239B2

(12) United States Patent
Parkvall et al.

(10) Patent No.: US 9,949,239 B2
(45) Date of Patent: *Apr. 17, 2018

(54) UPLINK SCRAMBLING DURING RANDOM ACCESS

(71) Applicant: Telefonaktiebolaget LM Ericsson (publ), Stockholm (SE)

(72) Inventors: Stefan Parkvall, Stockholm (SE); Erik Dahlman, Bromma (SE); Tobias Tynderfeldt, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/244,580

(22) Filed: Apr. 3, 2014

(65) Prior Publication Data

US 2014/0219257 A1 Aug. 7, 2014

Related U.S. Application Data

(63) Continuation of application No. 13/430,844, filed on Mar. 27, 2012, now Pat. No. 8,717,996, which is a (Continued)

(51) Int. Cl.
H04W 74/08 (2009.01)
H04W 72/02 (2009.01)
(Continued)

(52) U.S. Cl.
CPC ....... *H04W 72/0413* (2013.01); *H04W 72/02* (2013.01); *H04W 74/004* (2013.01); *H04W 74/0833* (2013.01)

(58) Field of Classification Search
CPC ......... H04W 74/0833; H04W 72/0413; H04W 72/02
(Continued)

(56) References Cited

U.S. PATENT DOCUMENTS 4,304,962 A 12/1981 Fracassi et al.
4,439,859 A 3/1984 Donnan
(Continued)

FOREIGN PATENT DOCUMENTS

DE 103 15 058 10/2004
EP 0 565 507 A2 1/1993
(Continued)

OTHER PUBLICATIONS

Supplementary European Search Report issued in European Patent Application No. 08779410.3 dated Aug. 13, 2014 (7 pgs).
(Continued)

*Primary Examiner* — Rasheed Gidado
(74) *Attorney, Agent, or Firm* — Baker Botts, LLP

(57) ABSTRACT

The technology described in this case facilitates random access by a user terminal with a radio base station. A user terminal determines one of a first type of uplink scrambling sequences and generates a random access message using the determined one of the first type of uplink scrambling sequences. The random access message is transmitted to the base station. The user terminal receives from the base station a second, different type of uplink scrambling sequence and uses it for subsequent communication with the radio base station. For example, the first uplink scrambling sequences may be specifically associated with the radio base station's cell area or a random access radio channel associated with the radio base station, but they are not specifically assigned to any user terminal, and the second uplink scrambling sequence may be selected from a second set of uplink scrambling sequences specifically assignable to individual user terminals.

31 Claims, 8 Drawing Sheets

Related U.S. Application Data continuation of application No. 11/835,782, filed on Aug. 8, 2007, now Pat. No. 8,169,992.

(51) Int. Cl.
　　*H04W 72/04*　　(2009.01)
　　*H04W 74/00*　　(2009.01)

(58) Field of Classification Search
　　USPC .................................................. 370/336, 329
　　See application file for complete search history.

(56) References Cited

U.S. PATENT DOCUMENTS

| | | | |
|---|---|---|---|
| 4,736,424 A | 4/1988 | Busby | |
| 4,984,000 A | 1/1991 | Watanabe et al. | |
| 5,164,040 A | 11/1992 | Eres et al. | |
| 5,430,760 A | 7/1995 | Dent | |
| 5,477,550 A | 12/1995 | Crisler et al. | |
| 5,566,170 A | 10/1996 | Bakke et al. | |
| 5,673,252 A | 9/1997 | Johnson et al. | |
| 5,752,078 A | 5/1998 | Delp et al. | |
| 5,754,754 A | 5/1998 | Dudley et al. | |
| 5,799,012 A | 8/1998 | Ayerst et al. | |
| 5,918,078 A | 6/1999 | Imura et al. | |
| 5,968,197 A | 10/1999 | Doiron | |
| 5,991,299 A | 11/1999 | Radogna et al. | |
| 6,005,852 A | 12/1999 | Kokko et al. | |
| 6,034,963 A | 3/2000 | Minami et al. | |
| 6,061,337 A | 5/2000 | Light et al. | |
| 6,069,886 A | 5/2000 | Ayerst et al. | |
| 6,301,441 B1 | 10/2001 | Kato | |
| 6,317,430 B1 | 11/2001 | Knisely et al. | |
| 6,359,877 B1 | 3/2002 | Rathonyi et al. | |
| 6,449,482 B1 | 9/2002 | Johansson et al. | |
| 6,473,399 B1 | 10/2002 | Johansson et al. | |
| 6,542,490 B1 | 4/2003 | Ahmadvand et al. | |
| 6,628,942 B1 | 9/2003 | Beming et al. | |
| 6,724,813 B1 | 4/2004 | Jamal et al. | |
| 6,772,215 B1 | 8/2004 | Rathonyi et al. | |
| 6,958,989 B1* | 10/2005 | Dick et al. | 370/342 |
| 6,965,580 B1 | 11/2005 | Takagi et al. | |
| 7,061,890 B2* | 6/2006 | Kim et al. | 370/335 |
| 7,120,132 B2 | 10/2006 | Choi et al. | |
| 7,701,919 B2 | 4/2010 | Ah Lee | |
| 7,738,423 B2 | 6/2010 | Khan | |
| 7,886,142 B2 | 2/2011 | Kwon | |
| 7,920,537 B2 | 4/2011 | Jones | |
| 8,150,327 B2 | 4/2012 | McCoy | |
| 8,169,992 B2 | 5/2012 | Parkvall et al. | |
| 8,180,058 B2* | 5/2012 | Kitazoe | H04W 12/02 380/270 |
| 8,228,827 B2 | 7/2012 | Jeong et al. | |
| 8,285,294 B2 | 10/2012 | Baldemair et al. | |
| 8,374,150 B2* | 2/2013 | Kitazoe | H04W 74/002 370/328 |
| 8,432,979 B2 | 4/2013 | Tiirola | |
| 8,437,416 B2 | 5/2013 | Tiirola et al. | |
| 8,625,601 B2 | 1/2014 | Gholmieh et al. | |
| 2001/0026543 A1 | 10/2001 | Hwang et al. | |
| 2002/0004397 A1 | 1/2002 | Lee et al. | |
| 2002/0041578 A1 | 4/2002 | Kim et al. | |
| 2002/0071480 A1 | 6/2002 | Marjelund et al. | |
| 2003/0067901 A1 | 4/2003 | Schein et al. | |
| 2003/0095528 A1 | 5/2003 | Halton et al. | |
| 2003/0133426 A1 | 7/2003 | Schein | |
| 2004/0131029 A1 | 7/2004 | Tobe et al. | |
| 2004/0156386 A1 | 8/2004 | Atarashi et al. | |
| 2005/0130655 A1 | 6/2005 | Lundh et al. | |
| 2005/0148368 A1 | 7/2005 | Scheinert et al. | |
| 2005/0271025 A1 | 12/2005 | Guethaus et al. | |
| 2006/0121907 A1 | 6/2006 | Mori et al. | |
| 2006/0172707 A1 | 8/2006 | Stern-Berkowitz et al. | |
| 2006/0234713 A1 | 10/2006 | Oswal et al. | |
| 2006/0239239 A1 | 10/2006 | Yang | |
| 2007/0093268 A1 | 4/2007 | Hosono et al. | |
| 2007/0097938 A1 | 5/2007 | Nylander et al. | |
| 2007/0147326 A1 | 6/2007 | Chen | |
| 2007/0147818 A1 | 6/2007 | Mori | |
| 2007/0160118 A1 | 7/2007 | Charbit | |
| 2007/0171889 A1 | 7/2007 | Kwon et al. | |
| 2007/0206531 A1* | 9/2007 | Pajukoski et al. | 370/329 |
| 2007/0253465 A1 | 11/2007 | Muharemovic | |
| 2008/0019306 A1 | 1/2008 | Damnjanovic | |
| 2008/0025337 A1* | 1/2008 | Smith et al. | 370/439 |
| 2008/0039141 A1 | 2/2008 | Claussen et al. | |
| 2008/0113684 A1 | 5/2008 | Jung et al. | |
| 2008/0165743 A1 | 7/2008 | Palanki et al. | |
| 2008/0192766 A1 | 8/2008 | Ranta-Aho et al. | |
| 2008/0194243 A1 | 8/2008 | Jeong et al. | |
| 2008/0207196 A1 | 8/2008 | Pettersson | |
| 2008/0232283 A1 | 9/2008 | Jen | |
| 2008/0232317 A1* | 9/2008 | Jen | 370/329 |
| 2008/0233940 A1* | 9/2008 | Jen | H04W 74/004 455/418 |
| 2008/0233960 A1* | 9/2008 | Kangude et al. | 455/436 |
| 2008/0233992 A1 | 9/2008 | Oteri et al. | |
| 2008/0273610 A1 | 11/2008 | Malladi et al. | |
| 2008/0310396 A1 | 12/2008 | Park et al. | |
| 2009/0022235 A1 | 1/2009 | Zhang et al. | |
| 2009/0041246 A1 | 2/2009 | Kitazoe | |
| 2009/0252125 A1 | 10/2009 | Vujcic | |
| 2009/0279192 A1 | 11/2009 | Harada et al. | |
| 2009/0316641 A1 | 12/2009 | Yamada et al. | |
| 2010/0067495 A1 | 3/2010 | Lee et al. | |
| 2010/0067498 A1 | 3/2010 | Lee et al. | |
| 2010/0093351 A1 | 4/2010 | Barrett et al. | |
| 2010/0093386 A1* | 4/2010 | Damnjanovic | H04W 52/04 455/522 |
| 2010/0113081 A1 | 5/2010 | Ishii et al. | |
| 2010/0118777 A1 | 5/2010 | Yamada et al. | |
| 2010/0118799 A1 | 5/2010 | Lee et al. | |
| 2010/0195579 A1 | 8/2010 | Park et al. | |
| 2010/0238872 A1 | 9/2010 | Kim et al. | |
| 2010/0323736 A1 | 12/2010 | Fischer et al. | |
| 2012/0087328 A1 | 4/2012 | Park et al. | |
| 2012/0328276 A1 | 12/2012 | Toyama et al. | |

FOREIGN PATENT DOCUMENTS

| | | |
|---|---|---|
| EP | 0 565 507 A3 | 1/1993 |
| EP | 0 565 507 A2 | 4/1993 |
| EP | 0 565 507 A2 | 10/1993 |
| EP | 0565507 | 10/1993 |
| EP | 0 768 806 A2 | 4/1997 |
| EP | 1 037 481 A1 | 9/2000 |
| EP | 1037 481 | 9/2000 |
| EP | 0 603 854 B1 | 3/2001 |
| EP | 1 146 762 A2 | 3/2001 |
| EP | 1 146 762 A3 | 3/2001 |
| EP | 1 146 762 A2 | 10/2001 |
| EP | 1146762 | 10/2001 |
| EP | 1 404 048 A1 | 3/2004 |
| EP | 1 519 0589 | 3/2005 |
| EP | 1605 710 | 12/2005 |
| EP | 1740002 | 3/2007 |
| EP | 1 760 695 B1 | 4/2013 |
| JP | 06350595 | 12/1994 |
| JP | 2011-033795 | 2/2011 |
| JP | 5148633 | 12/2012 |
| JP | 5148633 B2 | 2/2013 |
| RU | 2209528 C2 | 7/2003 |
| RU | 2214686 C2 | 10/2003 |
| WO | WO 98/34430 A1 | 1/1998 |
| WO | WO 98/34430 | 8/1998 |
| WO | WO 99/21375 | 4/1999 |
| WO | WO 00/76248 | 12/2000 |
| WO | WO 01/01641 | 1/2001 |
| WO | WO 01/05050 | 1/2001 |
| WO | WO 2004/047332 | 6/2004 |
| WO | WO 2004/047355 | 6/2004 |
| WO | WO 2005/006798 | 1/2005 |
| WO | WO 2005/032190 | 4/2005 |
| WO | WO 2005/091667 | 9/2005 |

(56) References Cited

FOREIGN PATENT DOCUMENTS

| WO | WO 2007/052968 | 5/2007 |
| WO | WO 2007/052968 A1 | 5/2007 |
| WO | WO 2007/053840 A2 | 5/2007 |
| WO | WO 2007/061252 | 5/2007 |
| WO | WO 2007/061252 A1 | 5/2007 |
| WO | WO 2007052968 A1 | 5/2007 |
| WO | WO 2008/020969 | 2/2008 |
| WO | WO 2008/022329 A2 | 2/2008 |
| WO | WO 2008/084969 | 7/2008 |
| WO | WO 2008/084969 A1 | 7/2008 |
| WO | WO 2008084969 A1 | 7/2008 |
| WO | WO 2008/104196 | 9/2008 |
| WO | WO 2008/113373 | 9/2008 |

OTHER PUBLICATIONS

Dahlman, *3G Long-Term Evolution*, Expert Radio Access Technologies, Ericsson Research, 2005, pp. 1-36.
English translation of Russian Official Action, Jun. 1, 2012 in Russian application No. 2010108231.
Dahlman, E. et al., "3G Evolution—HSPA and LTE for Mobile Broadband." Elsevier, Great Britain, 2007, 485 pages.
Horney, C. et al., "Smartphone & Chip Market Opportunities." Forward Concepts report for Samsung Electronics, Report No. 9010, Feb. 2009.
Tanno, M. et al., "Evolved UTRA—Physical Layer Overview." Proc. IEEE 8$^{th}$ Workshop on Signal Processing Advances in Wireless Communications 2007 (SPAWC 2007), Jun. 2007, 8 pages.
3GPP support team, "Draft minutes of the 52$^{nd}$ TSG-RAN WG2 meeting." TSG-RAN WG2 meeting #53, R2-061151, May 2006, 49 pages.
Ericsson, "Downlink scrambling." TSG-RAN WG1 #47, R1-063145, Nov. 2006, 1 page.
Nokia, "Procedure for non-synchronized random access." 3GPP TSG RAN WG1 #46bis, R1-062822, Oct. 2006, 3 pages.
NTT DoCoMo et al., "Non-synchronized Random Access Procedure for E-UTRA Uplink." 3GPP TSG RAN WG1 LTE Ad Hoc, R1-061660, Jun. 2006, 6 pages.
Respondents Samsung Electronics Co., Ltd et al.'s Response to the Complaint and Notice of Investigation (public version), In the Matter of Certain Electronic Devices, Including Wireless Communication Devices, Tablet Computers, Media Players, and Televisions, and Components Thereof, Inv. No. 337-TA-862 (I.T.C. filed Feb. 11, 2013).
The Samsung Respondents' Second Corrected Notice of Prior Art, In the Matter of Certain Electronic Devices, Including Wireless Communication Devices, Tablet Computers, Media Players, and Televisions, and Components Thereof Inv. No. 337-TA-862 (I.T.C. filed Apr. 12, 2013).
English translation of Russian Decision on Grant Patent for Invention and Conclusion Regarding Examination Results, Dec. 14, 2011 in Russian application No. 2010108231.
3$^{rd}$ Generation Partnership Project; Technical Specification Group Radio Access Network; Physical Channels and Modulation; 3GPP TS 36.211 v1.0.0 (Mar. 2007) (Release 8), RP-070169, pp. 1-30.
ETSI TS 136 300 v8.0.0, Universal Mobile Telecommunications System (UMTS); Evolved Universal Terrestrial Radio Access (E-UTRA) and Evolved Universal Terrestrial Radio Access (E-UTRAN); Overall Description; 3GPP TS 36.300 version 8.0.0 (Release 8), Mar. 2007, pp. 1-84.
3GPP TSG-RAN WG1 #44, TP on UL Interference Suppression Techniques, R1-060487. Feb. 13-17, 2006, 3 pgs.
Commission Investigative Staff's Notice of Prior Art. In the Matter of Certain Electronic Devices, Including Wireless Communication Devices, Tablet Computers, Media Players, and Televisions, and Components Thereof, Inv. No. 337-TA-862 (I.T.C. filed Apr. 12, 2013).
U.S. Appl. No. 11/773,752, filed Jul. 5, 2007, Inventor: Moe et al.
European Application No. PCT/EP2007/001737 filed Feb. 28, 2007, Inventor: Moe et al.
3GPP TSG-SA5 "Discussion on Automatic Neighbour Relation Lists for Te," (Telecom Management) Meeting SA5#53, May 7-11, 2007, Sophia Antipolis, France, S5-070974.
3GPP TS 36.00 V8.1.0, 3$^{rd}$ Generation Partnership Project; Technical Specification Group Radio Access Network; Evolved Universal Terrestrial Radio Access (E-UTRA) and Evolved Universal Terrestrial Access Network (E-UTRAN); Release 8, Jun. 2007, pp. 1-106.
Breitbach et al., "Operator Use Cases Related to self Organising Network", T-Mobile, Aug. 1, 2007, pp. 1-55.
International Search Report and Written Opinion of the International Searching Authority mailed Dec. 23, 2008 in corresponding PCT Application PCT/SE2008/050907.
International Preliminary Report mailed Feb. 25, 2010 in corresponding International Application No. PCT/SE2008/050907.
Office Action mailed May 26, 2010 in co-pending U.S. Appl. No. 11/838,770.
Office Action mailed Dec. 8, 2010 in co-pending U.S. Appl. No. 11/838,770.
European Search Report mailed Dec. 2, 2011 in corresponding EP Application No. 08 779 464.0.
Ericsson: "MCI Conflict Detection and Resolution", 3GPP Draft; S5-071569 E MCI Conflict Detection and Resolution, vol. SA WG5, No. Roma; 20070822, Aug. 22, 2007, XP050306211.
English translation of Chinese office action dated May 18, 2012 in Chinese Application No. 200880102532.9.
Office action mailed Feb. 9, 2012 in U.S. Appl. No. 11/838,770.
Office action mailed Aug. 31, 2011 in U.S. Appl. No. 11/838,770.
European office action mailed Sep. 6, 2011 in corresponding European Application No. 08 779 460.8-2412.
Ericsson, UE Measurements and Reporting of Global Cell Identity, 3GPP TSG-RAN WG2 #58bis; R2-072674, Jun. 22, 2007; XP050135465.
M. Amirijoo et al., Neighbor Cell Relation List and Measured Cell Identity Management in LTE, Network Operations and Management Symposium 2008, IEEE, Apr. 7, 2008, pp. 152-159, XP031290513.
3GPP TS 36.300 v0.1.0 (Oct. 2006), Section 8.2, p. 32.
English translation of Chinese Office Action in Chinese Patent Application No. 200880102742.8 dated Aug. 3, 2012.
International Search Report mailed Jan. 15, 2009 in corresponding PCT Application PCT/SE2008/050903.
English Translation of Chinese Official Action dated Jan. 31, 2013 in Chinese Application No. 200880102742.8.
Chinese Search Report dated Jan. 31, 2013 in Chinese Application No. 200880102742.8.
Office Action mailed Dec. 8, 2010 in co-pending U.S. Appl. No. 11/838,753.
Office Action mailed May 26, 2010 in co-pending U.S. Appl. No. 11/838,753.
U.S. Appl. No. 11/838,753, filed Aug. 14, 2007; Inventor: Frenger.
International Search Report mailed Jan. 1, 2009 in corresponding PCT Application PCT/SE2008/050903.
Office Action mailed Sep. 6, 2012 in U.S. Appl. No. 11/838,753.
Office Action mailed Feb. 5, 2013 in U.S. Appl. No. 11/838,753.
3GPP TS 36.300 V0.1.0 (Oct. 2006), Section 8.2 p. 32.
3rd Generation Partnership Project; Technical Specification Group Radio Access Network; Physical Channels and Modulation; 3GPP TS 36.211 v1.0.0 (Release 8), RP-070169, pp. 1-30, Mar. 2007.
ETSI TS 136 300 v8.0.0, Universal Mobile Telecommunications System (UMTS); Evolved Universal Terrestrial Radio Access (E-UTRA) and Evolved Universal Terrestrial Radio Access (E-UTRAN); Overall Description; 3GPP TS 36.300 version 8.0.0 (Release 8), pp. 1-84, Mar. 2007.
3GPP TSG-RAN WGI #44, TP on UL Interference Suppression Techniques, R1-060487., 3 pgs, Feb. 13-17, 2006.
English Summary of Japanese Office Action mailed Nov. 29, 2013 in JP Application No. 2012-180645.
3GPP TSG-RAN Meeting #49, Nov. 7-11, 2005, Tdoc R2-052798, pp. 1-4.
3GPP TSG-RAN WG2 #55, Oct. 9-13, 2006, R2-062995, pp. 1-6.

(56) References Cited

OTHER PUBLICATIONS

3GPP TSG-RAN WG2 #55, Oct. 9-13, 2006, R2-062911, pp. 1-5.
3GPP TSG-RAN WG2 Ad-hoc on LTE, Jun. 27-30, 2006, R2-061918, pp. 1-6.
3GPP TSG-RAN2 Meeting #50, Jan. 9-13, 2005, Tdoc R2-060041, pp. 1-4.
English translation of Russian Official Action, Jun. 1, 2012, in Russian application No. 2010108231.
English translation of Russian Decision on granted patent of invention and conclusion regarding Examination Results in Russian Application No. 2010108231, Dec. 14, 2011.
Dahlman, E. et al., "3G Evolution—HSPA and LTE for Mobile Broadband." Elsevier, Great Britian, 2007, 485 pages.
Homey, C. et al., "Smartphone & Chip Market Opportunities." Fonvard Concepts report for Samsung Electronics, Report No. 9010, Feb. 2009.
Kishiyama, Y. et al., "Investigations on Random Access Channel Structure in Evolved UTRA Uplink." 2006 3rd International Symposium on Wireless Communications Systems, Jul. 2006, 5 pages.
Tanno, M. et al., "Evolved UTRA—Physical Layer Overview." Proc. IEEE 8th Workshop on Signal Processing Advances in Wireless Communications 2007 (SPAWC 2007), Jun. 2007, 8 pages.
3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)." 3GPP TS 36.300, v8.1.0, Jun. 2007, 106 pages.
3rd Generation Partnership Project, "Universal Mobile Telecommunications System (UMTS); Evolved Universal Terrestrial Radio Access (E-UTRA) and Evolved Universal Terrestrial Radio Access Network (E-UTRAN); Overall description; Stage 2 (3GPP TS 36.300 version 8.8.0 Release 8)." ETSI TS 136.300, v8.0.0, Mar. 2007, 84 pages.
3GPP support team, "Draft minutes of the 52nd TSG-RAN WG2 meeting." TSG-RAN WG2 meeting #53, R2-061151, May 2006, 49 pages.
Catt, "Initial access and C-RNTI allocation for TDD." 3GPP TSG RAN WG2 #54, R2-062394, Aug. 2006, 5 pages.
Ericsson, "Contention Resolution." 3GPP TSG-RAN WGx #54, Tdoc R2-062494, Sep. 2006, 6 pages.
Ericsson, "Downlink scrambling." TSG-RAN WG1 #47, R1-063145, Nov. 2006, 1page.
Ericsson, "E-UTRA Random Access." TSG-RAN WG1 #43, R1-051445, Nov. 2005, 4 pages.
Ericsson, "E-UTRAN Random Access procedure C-RNTI assignment and HARQ on message 4 with RACH model." 3GPP TSG-RAN WG2 #56bis, Tdoc R2-070365, Jan. 2007, 4 pages.
Ericsson, "Feasibility of Random Access in E-UTRAN." 3GPP TSG-RAN WG2 Meeting #53, R2-061404, May 2006, 7 pages.
Ericsson, "Initial, Random Access and Identity Handling." TSG-RAN WG2 Meeting #51, Tdoc R2-060592, Feb. 2006, 7 pages.
Ericsson, "Non-Synchronized Random Access in E-UTRAN." 3GPP TSG-RAN WG2—Ad-Hoc on LTE, Tdoc R2-061866, Jun. 2006, 7 pages.
Ericsson, "Random Access Procedures for LTE." Joint RAN1/RAN2 meeting on LTE, Tdoc R2-060866, Mar. 2006, 7 pages.
Ericsson, "UE Identity Handling in LTE." TSG-RAN WG2 Meeting #52, Tdoc R2-060969, Mar. 2006, 3 pages.
Ericsson, "Uplink Scrambling for E-UTRA." TSG-RAN WG1 LTE Ad Hoc, R1-060109, Jan. 2006, 2 pages.
IPWireless, "Initial Cell Access Procedure in LTE." 3GPP TSG RAN WG2 #51, Tdoc R2-060380, Feb. 2006, 18 pages.
IPWireless, "Initial Cell Access Procedure in LTE." 3GPP TSG RAN WG2 #53, Tdoc R2-061305, May 2006, 5 pages.
LG Electronics, "Discussion on Message 4 in Random Access." 3GPP TSG RAN WG2 #57, R2-070519, Feb. 2007, 4 pages.
LG Electronics, "Discussion on Message 4 in Random Access." 3GPP TSG RAN WG2 #58bis, R2-072807, Jun. 2007, 4 pages.

LG Electronics, "LTE Random Access Use Cases." 3GPP TSG RAN WG2 Meeting #52/WG1 Meeting #44bis, R2-060890, Feb. 2006, 5 pages.
NEC, "Response to contention-free RACH." 3GPP TSG RAN WG2 Meeting #58bis, R2-072437, Jun. 2007, 4 pages.
Nokia, "Non-synchronized random access procedure." 3GPP TSG RAN WG1 LTE Ad Hoc, R1-061901, Jun. 2006, 4 pages.
Nokia, "Procedure for non-synchronized random access." 3GPP TSG RAN WG 1 #46bis, R1-062822, Oct. 2006, 3 pages.
Nokia et al., "Stage 3 topics of Random Access Procedure." 3GPP TSG RAN WG2 Meeting #58bis, R2-072409, Jun. 2007, 4 pages.
NTT DoCoMo, "Initial Access Procedure in LTE." 3GPP TSG RAN WG2 #55, R2-062995, Oct. 2006, 5 pages.
NTT DoCoMo, "Physical Channel Structures for Evolved UTRA." 3GPP TSG RAN WG1 Meeting #41, R1-050464, May 2005, 13 pages.
NTT DoCoMo et al., "Non-synchronized Random Access Procedure for E-UTRA Uplink." 3GPP TSG RAN WG 1 LTE Ad Hoc, R1-061660, Jun. 2006, 6 pages.
Philips, "Signalling for Random Access for LTE." 3GPP TSG-RAN WG2 Meeting #50, R2-060016, Jan. 2006, 6 pages.
Philips, "Signalling for Random Access for LTE." 3GPP TSG-RAN WG2 Meeting #51, R2-060430, Feb. 2006, 8 pages.
QUALCOMM Europe, "Access Procedures." 3GPP TSG-RAN WG2, R2-060996, Mar. 2006, 3 pages.
QUALCOMM Europe, "TP on UL Interference Suppression Techniques." 3GPP TSG-RAN WG1 #44, R1-060487, Feb. 2006, 3 pages.
Samsung, "Initial cell access in LTE." 3GPP TSG-RAN2 Meeting #49, R2-052798, Nov. 2005, 3 pages.
Samsung, "Initial cell access in LTE." 3GPP TSG-RAN2 Meeting #50, Tdoc R2-060041, Jan. 2005, 3 pages.
Samsung, "Initial cell access in LTE." 3GPP TSG-RAN3 Meeting #49, Tdoc R3-051360, Nov. 2005, 3 pages.
Samsung, "Proposed liaison to RAN 1 on Initial cell access in LTE." 3GPP TSG-RAN2 Meeting #49, R2-052799, Nov. 2005, 4 pages.
Samsung, "Proposed liaison to RAN 1 on Initial cell access in LTE." 3GPP TSG-RAN2 Meeting #50, TdocR2-060042, Jan. 2005, 4 pages.
Complaint of Ericsson Inc. et al. under Section 337 of the Tariff Act of 1930, as Amended (public version), In the Matter of Certain Electronic Devices, Including Wireless Communication Devices, Tablet Computers, Media Players, and Televisions, and Components Thereof, Inv. No. 337-TA-862 (I.T.C. filed Nov. 30, 2012).
Respondents Samsung Electronics Co., Ltd et al.'s Response to the Complaint and Notice ofInvestigation (public version), In the Matter of Certain Electronic Devices, Including Wireless Communication Devices, Tablet Computers, Media Players, and Televisions, and Components Thereof, Inv. No. 337-TA-862 (I.T.C. filed Feb. 11, 2013).
The Samsung Respondents' Second Corrected Notice of Prior Art, In the Matter of Certain Electronic Devices, Including Wireless Communication Devices, Tablet Computers, Media Players, and Televisions, and Components Thereof, Inv. No. 337-TA-862 (I.T.C. filed Apr. 12, 2013).
Commission Investigative Staffs Notice of Prior Art, In the Matter of Certain Electronic Devices, Including Wireless Communication Devices, Tablet Computers, Media Players, and Televisions, and Components Thereof, Inv. No. 337-TA-862 (I.T.C. filed Apr. 12, 2013).
Invalidity Contentions Draft Exhibit H-1—Claim Chart for U.S. Pat. No. 8,169,992 in view of ETSITS 136 300 V8.0.0 (served on Apr. 12, 2013 in I.T.C. proceedings).
Invalidity Contentions Draft Exhibit H-2—Claim Chart for U.S. Pat. No. 8,169,992 in view of "Non-synchronized random access procedure" (served on Apr. 12, 2013 in I.T.C. proceedings).
First Amended Complaint for Patent Infringement, *Ericsson Inc.* v. *Samsung Electronics Co., Ltd.*, Civil Action No. 6:12-cv-894 (E.D. Tex. filed Jan. 29, 2013).
Samsung's First Amended Answer, Affirmative Defenses and Counterclaims to Ericsson's First Amended Complaint for Patent Infringement, *Ericsson Inc.* v. *Samsung Electronics Co., Ltd.*, Civil Action No. 6:12-cv-894 (E.D. Tex. filed Apr. 5, 2013).

(56) References Cited

OTHER PUBLICATIONS

Ericsson's Answer, Affirmative Defenses and Counterclaims to Samsung's First Amended Answer, Affirmative Defenses and Counterclaims, *Ericsson Inc. v. Samsung Electronics Co., Ltd.*, Civil Action No. 6:12-cv-894 (E.D. Tex. filed Apr. 22, 2013).
Samsung's Response to Ericsson's Answer, Affirmative Defenses and Counterclaims to Samsung's First Amended Answer, Affirmative Defenses and Counterclaims, *Ericsson Inc. v. Samsung Electronics Co., Ltd.*, Civil Action No. 6:12-cv-894 (E.D. Tex. filed May 16, 2013).
U.S. Appl. No. 11/835,782, filed Aug. 8, 2007; Parkvall et al.
International Search Report mailed Dec. 18, 2008 in corresponding PCT Application PCT/SE2008/050832.
International Preliminary Report mailed Feb. 9, 2010 in corresponding PCT Application PCT/SE2008/050832.
Dahlman, *3G Lon£-Term Evolution*, Expert Radio Access Technologies, Ericsson Research, 2005, pp. 1-36.
*3GPP 36.300 CR Draft*, 3GPP TSG-RAN2 Meeting #58bis, Orlando, USA, Jun. 25-29, 2007, pp. 1-91.
TSG-RAN-WG1 #44bis; Athens, Greece; Source: Ericsson; Title: E-UTRA Downlink Control Signaling-Texas Proposal (R1-060996) Mar. 27-31, 2006.
3GPP TSG RAN WG2 #54; Tallinn, Estonia; Source: CATT; Title: Initial access and C-RNTI allocation for TDD (R2-062394) Aug. 28-Sep. 1, 2006.
3GPP TSG-RAN WG2 #55; Seoul, Korea; Source: NTT DoCoMo, Inc.; Title: Initial Access Procedure in LTE (R2-062995) Oct. 9-13, 2006.
3GPP TSG-RAN WG2 #58bis; Orlando, United States; Source: LG Electronics; Title: Discussion on Message 4 in Random Access (R2-072807) Jun. 25-29, 2007.
3GPP TSG-RAN WG2 Meeting #53; Shanghai, China; Source: Ericsson; Title: Feasibility of Random Access in E-UTRAN (Tdoc R2-061404) May 8-12, 2006.
3GPP TSG-RAN WG2 #57; St. Louis, USA; Source: LG Electronics; Title: Discussion on Message 4 in Random Access (R2-070519) Feb. 15-19, 2007.
3GPP TSG-RAN WG2 Meeting #58bis; Oralnd, USA; Source: NEC; Title: Response to contention-free RACH (R2-072437) Jun. 25-29, 2007.
TSG-RAN WG2 meeting #53; Shanghai, China; Source: 3GPP support team; Title: Draft minutes of the 52nd TSG-RAN WG2 meeting (R2-061151) May 8-12, 2006.
3GPP TSG-RAN2 Meeting #50; Sophia Antipolis, France; Source: Samsung; Title: Initial cell access in LTE (Tdoc R2-060041) Jan. 9-13, 2005.
3GPP TSG-RAN WG2 Meeting #50; Sophia-Antipolis, France; Source: Philips; Title: Signalling for Random Access for LTE (R2-060016) Jan. 9-13, 2006.
TSG-RAN WG2 #51; Denver, US; Source: Ericsson; Title: Initial, Random Access and Identity Handling (Tdoc R2-060592) Feb. 13-17, 2006.
3GPP TSG-RAN WGx #54; Tallinn, Estonia; Source: Ericsson (rapporteur); Title: Contention Resolution (Tdoc R2-062494) Aug. 28-Sep. 1, 2006.
TSG-RAN WG1 #43; Seoul, Korea; Source: Ericsson, et al.; Title: Text Proposal on Downlink Transmission Scheme for E-UTRA (R1-051440) Nov. 7-11, 2005.
3GPP TSG RAN WG2 #53; Shanghai, China; Source: IPWireless; Initial Cell Access Procedure in LTE (Tdoc R2-061305) May 8-13, 2006.
3GPP TSG-RAN WG2 #56 bis; Sorrento, Italy; Source: Ericsson; Title: E-UTRAN Random Access proedure C-RNTI assignment and HARQ on message 4 with RACH model (Tdoc R2-070365) Jan. 15-19, 2007.
TSG-RAN WG1 LTE Ad Hoc Meeting; Helsinki, Finland; Source: Ericsson; Title: Link Adaptation for E-UTRA Downlink (R1-060101) Jan. 23-25, 2006.

3GPP TSG-RAN WG2—Ad Hoc on LTE; Cannes, France; Source: Ericsson; Title: Non-Synchronized Random Access in E-UTRAN (Tdoc R2-061866) Jun. 27-30, 2006.
3GPP TSG-RAN WG2 Meeting #58bis; Orlando, U.S.A.; Source: Nokia, Nokia Siemens Networks; Title: Stage 3 topics of Random Access Procedure (R2-072409) Jun. 25-29, 2007.
TSG-RAN WG1 #47, Riga, Latvia; Source: Ericsson; Title: Downlink scrambling (R1-063145) Nov. 6-10, 2006.
3GPP TSG RAN WG2 #51; Denver, Colorado; Source: IPWireless; Title: Initial Cell Access Procedure in LTE (Tdoc R2-060380) Feb. 13-17, 2006.
3GPP TSG-RAN WG2 Meeting #51; Denver, USA; Source: Philips; Title: Signalling for Random Access for LTE (R2-060430) Feb. 13-17, 2006.
TSG-RAN WG1 #43; Seoul, Korea; Source: Ericsson; Title: E-UTRA Random Access (R1-051445) Nov. 7-11, 2005.
3GPP TSG RAN WG2 Meeting #52 / WG1 Meeting #44bis; Athens, Greece; Source: LG Electronics; Title: LTE Random Access Use Cases (R2-060890) Feb. 13-17, 2006.
3GPP TSG-RAN WG2; Athens, Greece; Source: QUALCOMM Europe; Title: Access Procedures (R2-060996) Mar. 27-31, 2006.
Joint RAN1/RAN2 meeting on LTE; Athens, Greece; Source: Ericsson; Title: Random Access Procedures for LTE (Tdoc R2-060866) Mar. 27-31, 2006.
3GPP TSG RAN WG1 #46bis; Seoul, Korea; Source: Nokia; Title: Procedure for non-synchronized random access (R1-062822) Oct. 9-13, 2006.
TSG-RAN WG1 LTE AdHoc; Helsinki, Finland; Source: Ericsson; Title: Uplink Scrambling for E-UTRA (R1-060109) Jan. 23-25, 2006.
TSG-RAN WG2 Meeting #52; Athens, Greece; Source: Ericsson; Title: UE Identity Handling in LTE (Tdoc R2-060969) Mar. 27-31, 2006.
3GPP TSG RAN WG1 LTE Ad Hoc; Cannes, France; Source: NTT DoCoMo, Fujitsu, NEC, Sharp, Toshiba Corporation; Title: Non-synchronized Random Access Procedure for E-UTRA Uplink (R1-061660) Jun. 27-30, 2006.
3GPP TSG RAN WG1 LTE Ad Hoc; Source: Nokia; Title: Non-synchronized random access procedure (R1-061901) Jun. 27-30, 2006.
3GPP TSG RAN WG1 Meeting #41; Athens, Greece; Source: NTT DoCoMo; Title: Physical Channel Structures for Evolved UTRA (R1-050464) May 9-13, 2005.
3GPP TSG-RAN WG1 #44; Source: QUALCOMM Europe; Title: TP on UL Interference Suppression Techniques (R1-060487) Feb. 13-17, 2006.
3GPP TSG-RAN2 Meeting #49; Source: Samsung; Title: Initial cell access in LTE (Tdoc R2-052798) Nov. 7-Nov. 11, 2005.
3GPP TSG-RAN2 Meeting #49; Seoul, Korea; Source: Samsung; Title: Proposed liaison to RAN 1 on "Initial cell access in LTE" (Tdoc R2-052799) Nov. 7-11, 2005.
3GPP TSG-RAN2 Meeting #50; Sophia Antipolis, France; Source: Samsung; Title: Proposed liaison to RAN 1 on "Initial cell access in LTE" (Tdoc R2-060042) Jan. 9-13, 2005.
3GPP TSG RAN3 Meeting #49; Seoul, Korea; Source: Samsung; Title: Initial cell access in LTE (resubmission of R2-052798) (Tdoc R3-051360) Nov. 7-11, 2005.
3GPP TSG RAN WG2 Ad-hoc on LTE; Cannes, France; Source: NTT DoCoMo Inc., NEC; Title: Non-synchronised Access Burst Procedure in LTE (R2-061918) Jun. 27-30, 2006.
ETSI TS 136 300 V.8.0.0; Technical Specification; Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.0.0 Release 8) Mar. 2007.
Draft EN 300 940 V6.2.0; European Standard (Telecommunications series) Digital cellular telecommunications system (Phase 2+); Mobile radio interface layer 3 specification (GSM 04.08 version 6.2.0 Release 1997) Dec. 1998.
3GPP TSG-RAN WG2 #58-bis; Orlando, Florida, USA; Source: ASUSTeK; Title: UE Identify Validity in RA Procedure (R2-072897) Jun. 25-29, 2007.

(56) References Cited

OTHER PUBLICATIONS

TS 101 351 V6.2.0; Technical Specification; Digital cellular telecommunications system (Phase 2+); General Packet Radio Service (GPRS); Mobile Station (MS)—Serving GPRS Support Node (SGSN) Logical Link Control (LLC) layer specification (GSM 04.64 version 6.2.0 Release 1997) Nov. 1998.
3G Long-term evolution; Dr. Erik Dahlman; Expert Radio Access Technologies; Ericsson Research; 2005.
PCT International Search Report for International application No. PCT/SE2008/050832; Dec. 18, 2008.
3G Evolution; HSPA and LTE for Mobile Broadband; Erik Dahlman et al.; 2007 Due to size, this references has been split into 4 parts.
3GPP TS 36.211 V1.0.0; 3rd Generation Partnership Project; Technical Specifrication Group Radio Access Network; Physical Channels and Modulation (Release 8) Mar. 2007.
3GPP TS 36.300 V8.1.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8) Jun. 2007.
Evolved Utra—Physical Layer Overview by Motohiro Tanno et al.; IEEE 2007.
Investigations on Random Access Channel Structure in Evolved UTRA Uplink by Yoshihisa Kishiyama et al. IEEE 2006.
Horney, C. et al.; Smartphone & Chip Market Opportunities; Strategies & Insight into the Advanced Class of Mobile Phones and the ICs that enable them by Samsung Electronics; Report No. 9010; Feb. 2009 (Part 1 of 7).
Horney, C. et al.; Smartphone & Chip Market Opportunities; Strategies & Insight into the Advanced Class of Mobile Phones and the ICs that enable them by Samsung Electronics; Report No. 9010; Feb. 2009 (Part 2 of 7).
Horney, C. et al.; Smartphone & Chip Market Opportunities; Strategies & Insight into the Advanced Class of Mobile Phones and the ICs that enable them by Samsung Electronics; Report No. 9010; Feb. 2009 (Part 3 of 7).
Horney, C. et al.; Smartphone & Chip Market Opportunities; Strategies & Insight into the Advanced Class of Mobile Phones and the ICs that enable them by Samsung Electronics; Report No. 9010; Feb. 2009 (Part 4 of 7).
Horney, C. et al.; Smartphone & Chip Market Opportunities; Strategies & Insight into the Advanced Class of Mobile Phones and the ICs that enable them by Samsung Electronics; Report No. 9010; Feb. 2009 (Part 5 of 7).
Horney, C. et al.; Smartphone & Chip Market Opportunities; Strategies & Insight into the Advanced Class of Mobile Phones and the ICs that enable them by Samsung Electronics; Report No. 9010; Feb. 2009 (Part 6 of 7).
3GPP TS 36.300 V8.0.0; Technical Specificaton; 3rd Generation Partnership Project; Technical Specification Group Radio Access Network; Evolved Universal Terrstrial Radio Access (E-UTRA) and Evolved Universal Terrestrial Radio Access (E-UTRA) and Evolved Universal Terrestrial Radio Access Network (E-UTRAN); Overall description; Stage 2 (Release 8) Jan. 2007.
3GPP TS 36.300 V8.1.0; 3rd Generation Partnership Project; Technical Specification Group Radio Access Net Universal Terrestrial Radio Access (E-UTRA) and Evolved Universal Terrestrial Radio Access Network (E-UTRAN); Overall description; Stage 2 (Release 8) Jun. 2007.
3GPP TS 36.300 v8.0.0; Technical Specificaton; 3rd Generation Partnership Project; Technical Specification Grup Radio Access Network; Evolved Universal Terrestrial Radio Access (E-UTRA) and Evolved Universal Terrestrial Radio Access Network (E-UTRAN); Overall description; Stage 2 (Release 8) Mar. 2007.
3GPP TSG-RAN WG2 #56bis; Sorrento, Italy, Jan. 15-19, 2007; Source: Ericsson; Title: E-UTRAN Random Access procedure C-RNTI assignment and HARQ on message 4 with RACH model (Tdoc R2-070365).
PCT International Preliminary Report on Patentability for International application No. PCT/SE2008/050832; mailed Dec. 18, 2008.
PCT/International Search Report for International application No. PCT/US99/14208; mailed Oct. 21, 1999.
3GPP TSG-RAN WG2 Ad-hoc on LTE; Cannes, France; Source: NTT DoCoMo Inc., NEC; Title: Non-synchronised Access Burst Procedure in LTE (R2-061918) Jun. 27-30, 2006.
Jamison, K.D. et al. "Seeded pulsed supersonic molecular beam growth of silicon carbide thin films", J. Vac. Sci. Technol. A, vol. 16 No. 3, May/Jun. 1998: 1327-1330.
Ferguson, B.A. et al. "Supersonic jet epitaxy of III-nitride semiconductors", J. Crystal Growth vol. 178, 1997; 134-146.
IEEE Transactions on Communications, vol. 45, No. 1, Jan. 1997; "Throughput Analysis of Some ARQ Protocols in the Presence of Feedback Errors" Richard Cam and Cyrl Leung.
TS 100 939 V6.2.0 (Oct. 1998) Technical Specification; Digital Cellular Telecommunications System (Phase 2+); Mobile Radio Interface Signalling layer 3; General aspects (GSM 04.07 version 6.2.0 Release 1997) GSM Global System for Mobile Communications.
3GPP TR 25.814 V7.1.0 (Sep. 2006), 3rd Generation Partnership Project; Technical Specification Group Radio Access Network; Physical layer aspects for evolved Universal Terrestrial Radio Access (UTRA) (Release 7) ("3GPP TR 25.814 V7.1.0"), Oct. 13, 2006.
3GPP TS 36.211 V0.2.1 (Nov. 2006), 3rd Generation Partnership Project; Technical Specification Group Radio Access Network; Physical Channels and Modulation (Release 8) ("3GPP TS 36.211 V0.2.1"), Dec. 11, 2006.
3GPP TS 36.211 V0.2.3 (Jan. 2007), 3rd Generation Partnership Project; Technical Specification Group Radio Access Network; Physical Channels and Modulation (Release 8) ("3GPP TS 36.211 V0.2.3"), Jan. 15-19, 2007.
3GPP TS 36.211 V1.1.0 (May 2007), 3rd Generation Partnership Project; Technical Specification Group Radio Access Network; Physical Channels and Modulation (Release 8) ("3GPP TS 36.211 V1.1.0"), Jun. 21, 2007.
3GPP TS 36.300 V8.0.0 (Mar. 2007, 3rd Generation Partnership Project; Technical Specification Group Radio Access Network; Evolved Universal Terrestrial Radio Access (EUTRA) and Evolved Universal Terrestrial Radio Access Network (E-UTRAN); Overall description; Stage 2 (Release 8) ("3GPP TS 36.300 V8.0.0"), Apr. 16, 2007.
IEEE C802.20-05/69 (Oct. 28, 2005), IEEE 802.20 Working Group on Mobile Broadband Wireless Access; QFDD and QTDD: Proposed Draft Air Interface Specification ("802.20-05/69"), Oct. 28, 2005.
IEEE C802.20-05/88r1 (Jan. 6, 2006), IEEE 802.20 Working Group on Mobile Broadband Wireless Access; MBTDD Wideband Mode Performance Report 2 ("802.20-05/88r1").
IEEE C802.20-06/04 (Jan. 6, 2006), IEEE 802.20 Working Group on Mobile Broadband Wireless Access; MBFDD and MBTDD: Proposed Draft Air Interface Specification ("802.20-06/04").
R1-050464, Physical Channel Structures for Evolved UTRA, NTT DoCoMo, 3GPP TSG-RAN WG1 #41, May 9-13, 2005 ("R1-050464"), May 2005.
R1-060109, Uplink Scrambling for E-UTRA, Ericsson, 3GPP TSG-RAN WG1 LTE Ad Hoc, Jan. 23-25, 2006 ("R1-060109").
R1-060487, TP on UL Interference Suppression Techniques, QUALCOMM Europe, 3GPP TSG-RAN WG1 #44, Feb. 13-17, 2006 ("R1-060487").
R1-061856, Non-Synchronized Random Access Procedure, Huawei, 3GPP TSG-RAN WG 1 LTE Ad Hoc, Jun. 27-30, 2006 ("R1-061856").
R1-061901, Non-Synchronized Random Access Procedure, Nokia, 3GPP TSG-RAN WG 1 LTE Ad Hoc, Jan. 23-25, 2006 ("R1-061856"), Jun. 27-30, 2006.
R1-062049, Design of UL Reference Signals, Qualcomm Europe, 3 GPP TSG-RAN WG 1 #46, Aug. 28-Sep. 2, 2006 ("R1-062049").
R1-062694, Design of UL Reference Signals, Qualcomm Europe, 3GPP TSG-RAN WG1 #46bis, Oct. 9-13, 2006 ("R1-062694").
R1-062856, Uplink Reference Signals, Ericsson, 3GPP TSG-RAN WG 1 #46bis, Oct. 9-13, 2006 ("R1-062856").
R1-063144, Uplink Scrambling for LTE, Ericsson, 3GPP TSGRAN WG1 #47, Nov. 6-10, 2006 ("R1-063144").

(56) References Cited

OTHER PUBLICATIONS

R1-072083, Reference Signal Generation and Selection for EUTRA Uplink, Panasonic, 3GPP TSG-RAN WG1 #49, May 5-11, 2007 ("R1-072083").
R1-072207, Sounding Reference Signal Assignments in E-UTRA Uplink, Texas Instruments, 3GPP TSG-RAN WG1 #49, May 7-11, 2007 ("R1-072207").
R2-060041, Initial Cell Access in LTE, Samsung, 3GPP TSG-RAN WG2 #50, Jan. 9-13, 2005 ("R1-060041").
R2-060430, Signalling for Random Access for LTE, Philips, 3GPP TSG-RAN WG2 #51, Feb. 13-17, 2006 ("R2-060430").
R2-061404, Feasibility of Random Access in E-UTRAN, Ericsson, 3GPP TSG-RAN WG2 #53, May 8-12, 2006 ("R2-061404").
UMTS/IMT-2000 Based on Wideband CDMA, Erik Dahlman et al. (Sep. 1998) ("UMTS/IMT-2000 Based on Wideband CDMA").
3G Evolution: HSPA and LTE for Mobile Broadband, Dahlman et al. 2007 (Elsevier, 1st ed. 2007) ("3G Evolution").
R1-050764, Inter-Cell Interference Handling for E-UTRA, Ericsson, 3GPP TSGRAN WG1 #42, Aug. 29-Sep. 2, 2005 ("R1-050764").
R1-061660, Non-Synchronized Random Access Procedure for EUTRA Uplink, NTT DoCoMo et al., 3GPP TSG-RAN WG1 LTE Ad Hoc, Jun. 27-30, 2006 ("R1-061660").
R1-062822, Procedure for Non-Synchronized Random Access, Nokia, 3GPP TSG-RAN WG1 #46bis, Oct. 9-13, 2006 (R1-062822).
R2-060132, RRC Connection Establishment Procedure for E-UTRA, IPWireless, 3GPP TSGRAN WG2 #50, Jan. 9-13, 2006 ("R2-060132").
R2-060380, Initial Cell Access Procedure in LTE, IPWireless, 3GPP TSG-RAN WG2 #51, Feb. 13-17, 2006 ("R2-060380").
R2-061305, Initial Cell Access Procedure in LTE, IPWireless, 3GPP TSG-RAN WG2 #53, May 8-13, 2006 ("R2-061305").
R1-072409, Stage 3 Topics of Random Access Procedure, 3GPP TSG-RAN WG2 #58bis, Jun. 25-29, 2007 ("R2-072409").
3GPP TS 25.213 V7.2.0 (May 2007), 3rd Generation Partnership Project; Technical Specification Group Radio Access Network; Spreading and modulation (FDD) (Release 7) ("3GPP TS 25.213 V7.2.0"), Jun. 21, 2007.
3GPP2 C.S0024-B V1.0 (May 2006), 3rd Generation Partnership Project 2; cdma2000 High Rate packet Data Air Interface Specification ("S0024-BV1.0").
3GPP2 C.S0084-001-0 V1.0 (Apr. 5, 2007), 3rd Generation Partnership Project 2; Physical Layer for Ultra Mobile Broadband (UMB) Air Interface Specification ("S0084-001-0 V1.0").
3GPP2 C.S0084-002-0 V1.0 (Apr. 2007), 3rd Generation Partnership Project 2; Medium Access Control Layer for Ultra Mobile Broadband (UMB) Air Interface Specification ("S0084-002-0 V1.0").
ETSI TR 101.146 V3.0.0, (Dec. 1997), Universal Mobile Telecommunications System (UMTS); UMTS Terrestrial Radio Access (UTRA); Concept evaluation (UMTS 30.06 version 3.0.0) ("ETSI TR.101.146 V3.0.0"), Dec. 15, 1997.
ETSI TS 125.213 V7.0.0 (Mar. 2006), Universal Mobile Telecommunications System (UMTS); Spreading and modulation (FDD) (3GPP TS 25.213 version 7.0.0 Release 7) ("ETSI TS 125.213 V7.0.0"), Mar. 22, 2006.
TIA/EIA/IS-95-A (May 1995), TIA/EIA Interim Standard ("IS-95-A").
An Introduction to Spread Spectrum, Charles E. Cook & Howard S. March, IEEE Communications Magazine (Mar. 1983) ("Introduction to Spread Spectrum").
Spread Spectrum Communications—Myths and Realities, Andrew J. Viterbi, IEEE Communications Magazine (May 1979) ("Spread Spectrum Communications").
The Aloha System—Another Alternative for Computer Communications, Norman Abramson, IEEE Communications Magazine (1970) ("Aloha System").

WCDMA: The Radio Interface for Future Mobile Multimedia Communications, Erik Dahlman et al., IEEE Transactions on Vehicular Technology (Nov. 1998) ("WCDMA: The Radio Interface for Future Mobile Multimedia").
Extended European Search Report for Application No./Patent No. 15190589.0-1857, Jan. 12, 2016.
Viterbi, Andrew J., "Spread Spectrum Communications—Myths and Realities," IEEE Communications Magazine, pp. 11-18, May 1979.
Cook, Charles E. and Marsh, Howard S., "An Introduction to Spread Spectrum," IEEE Communications Magazine, pp. 8-16, 1983.
TIA/EIA Interim Standard, Mobile Station-Base Station Compatibility Standard for Dual-Mode Wideband Spread Spectrum Cellular System, TIA/EIA/IS-95-A, Telecommunications Industry Association. (Pdfs Part A and Part B), May 1995.
Dahlman, Erik et al., UMTS/IMT-2000 Based on Wideband CDMA, Ericsson Radio Systems AB, IEEE Communications Magazine, pp. 70-80, Sep. 1998.
3GPP TSG RAN1 #46, Title: Design of UL Reference Signals, Source: Qualcomm Europe, R1-062049, Tallinn, Estonia, pp. 1-6, Aug. 28-Sep. 2, 2006.
TSG-RAN WG1 #46bis, Title: Uplink reference signals, Source: Ericsson, R1-062856, Seoul, Korea, pp. 1-6, Oct. 9-13, 2006.
3GPP TSG RAN1 #46-bis, Title: Design of UL Reference Signals, Source: Qualcomm Europe, R1-062694, Seoul, Korea, pp. 1-7, Oct. 9-13, 2006.
TSG-RAN WG1 #47, Title: Uplink Scrambling for LTE, Source: Ericsson, R1-063144, Riga, Latvia, pp. 1-2, Nov. 6-10, 2006.
3GPP TSG RAN WG1 Meeting #49, Title: Reference signal generation and selection for E-UTRA uplink, Source: Panasonic, R1-072083, Kobe, Japan, 4 pages, May 7-11, 2007.
Tomcik, Jim, QFDD and QTDD: Proposed Draft Air Interface Specification, IEEE C802.20-05/69, Working Group on Mobile Broadband Wireless Access, http://ieee802.org/20/. (Pdfs Parts A1-A14 and Parts B1-B12), Oct. 28, 2005.
Tomcik, Jim, MBFDD and MBTDD: Proposed Draft Air Interface Specification, IEEE C802.20-06/04, Working Group on Mobile Broadband Wireless Access, http://ieee802.org/20/. (Pdfs Part A and Parts B1-B4), Jan. 6, 2006.
3rd Generation Partnership Project 2 "3GPP2", cdma2000 High Rate Packet Data Air Interface Specification, 3GPP2 C.S0024-B, Version 1.0. (Pdfs Parts A and B), May 2006.
Chapman, Tom, "iBurst: An overview for iRANI", ERC_9531TC00354330, Roke Manor Research, 337-TA-953, RX-870.0001-RX870.0020, 2005.
Tomcik, Jim, Qualcomm, Incorporated, QFDD Performance Report 1, Working Group on Mobile Broadband Wireless Access, IEEE C802.20-05/61, http://ieee802.org/20/, pp. 1-77, Oct. 28, 2005.
Tomcik, Jim, Qualcomm, Incorporated, QFDD Performance Report 1, Working Group on Mobile Broadband Wireless Access, IEEE C802.20-05/61, ERC_953ITC00378531, 337-TA-953, http://ieee802.org/20/, pp. RX-871.0001-RX-871.0077, Oct. 28, 2005.
Tomcik, Jim, Qualcomm, Incorporated, QFDD and QTDD: Proposed Draft Air Interface Specification, Working Group on Mobile Broadband Wireless Access, IEEE C802.2005/69, ERC_9531TC00378760, 337-TA-953, http://ieee802.org/20/, pp. RX-873.0001-RX-873.0247, Oct. 28, 2005.
Tomcik, Jim, Qualcomm, Incorporated, QFDD and QTDD: Proposed Draft Air Interface Specification, Working Group on Mobile Broadband Wireless Access, IEEE C802.2005/69, ERC_9531TC00379007, http://ieee802.org/20/, pp. RX-873.0248-RX-873.0473, Oct. 28, 2005.
Tomcik, Jim, Qualcomm, Incorporated, QFDD and QTDD: Proposed Draft Air Interface Specification, Working Group on Mobile Broadband Wireless Access, IEEE C802.2005/69, ERC 9531TC00379233, http://ieee802.org/20/, RX-873.0474-RX-873.0624, Oct. 28, 2005.
Tomcik, Jim, Qualcomm, Incorporated, QFDD Technology Overview Presentation, Working Group on Mobile Broadband Wireless Access, IEEE C802.20-05-59, ERC 953ITC00378461, 337-TA-953, http://ieee802.org/20/, RX-977.0001-RX-977.0070, Oct. 28, 2005.

(56) References Cited

OTHER PUBLICATIONS

Tomcik, Jim, Qualcomm, Incorporated, Submission, QFDD Technology Overview Presentation, Working Group on Mobile Broadband Wireless Access, IEEE C802.20-05-64r1, http://ieee802.org/20/, Slides 1-76, Nov. 15, 2005.

Jette, Al., et al., UMBFDD Draft Technology Overview, Working Group on Mobile Broadband Wireless Access, IEEE C802.20-07/09, ERC_9531TC00379605, pp. 1-34, Mar. 5, 2007.

Paper, ERC_9531TC00344826-ERC_953ITC00344852, Printed Jun. 22, 2016.

Defendant Apple Inc.'s P.R. 3-3 Invalidity Contentions, Ericsson Inc. And Telefonaktiebolaget *LM Ericsson* v. *Apple Inc.*, Civil Action No. 2:15-cv-287-JRG-RSP, United States District Court Eastern District of Texas Marshall Division (due to size, this document has been split into 7 parts)—Jul. 20, 2015.

Exhibit A-1 to Defendant Apple Inc.'s P.R. 3-3 Invalidity Contentions, *Ericsson Inc. and Telefonaktiebolaget LM Ericsson* v. *Apple Inc.*, Civil Action No. 2:15-cv-287-JRG-RSP, United States District Court Eastern District of Texas Marshall Division (due to size, this document has been split into 2 parts)—Jul. 20, 2015.

Exhibit A-2 to Defendant Apple Inc.'S P.R. 3-3 Invalidity Contentions, *Ericsson Inc. and Telefonaktiebolaget LM Ericsson* v. *Apple Inc.*, Civil Action No. 2:15-cv-287-JRG-RSP, United States District Court Eastern District of Texas Marshall Division—Jul. 20, 2015.

Exhibit A-3 to Defendant Apple Inc.'s P.R. 3-3 Invalidity Contentions, *Ericsson Inc. and Telefonaktiebolaget LM Ericsson* v. *Apple Inc.*, Civil Action No. 2:15-cv-287-JRG-RSP, United States District Court Eastern District of Texas Marshall Division—Jul. 20, 2015.

Exhibit A-4 to Defendant Apple Inc.'s P.R. 3-3 Invalidity Contentions, *Ericsson Inc. and Telefonaktiebolaget LM Ericsson* v. *Apple Inc.*, Civil Action No. 2:15-cv-287-JRG-RSP, United States District Court Eastern District of Texas Marshall Division—Jul. 20, 2015.

Exhibit A-5 to Defendant Apple Inc.'s P.R. 3-3 Invalidity Contentions, *Ericsson Inc. and Telefonaktiebolaget LM Ericsson* v. *Apple Inc.*, Civil Action No. 2:15-cv-287-JRG-RSP, United States District Court Eastern District of Texas Marshall Division—Jul. 20, 2015.

Exhibit A-6 to Defendant Apple Inc.'s P.R. 3-3 Invalidity Contentions, *Ericsson Inc. and Telefonaktiebolaget LM Ericsson* v. *Apple Inc.*, Civil Action No. 2:15-cv-287-JRG-RSP, United States District Court Eastern District of Texas Marshall Division—Jul. 20, 2015.

Russian Patent Office, Decision on Grant for Russian Patent Application No. 2013-103676/07(005274)(English Translation), dated Feb. 22 2017.

Patent Office, Government of India, Examination Report for Application No. 816/KOLNP/2010, 8 pages, dated Jun. 27, 2017.

* cited by examiner

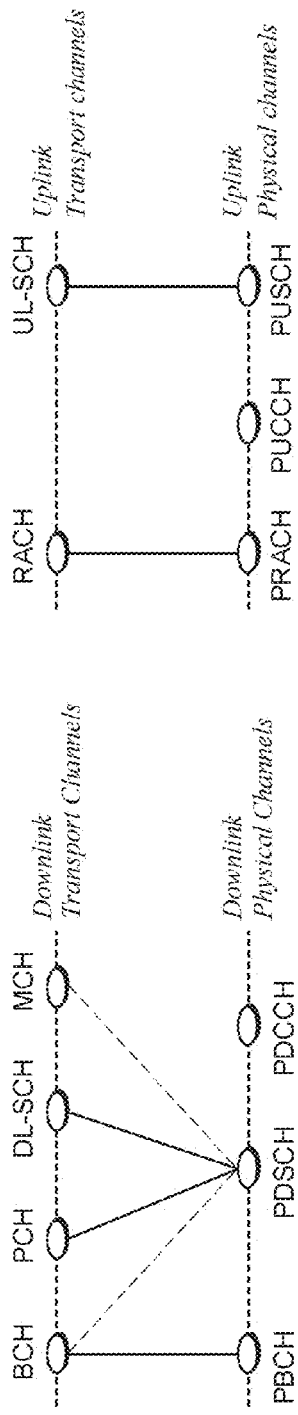
Figure 5A
Figure 5B
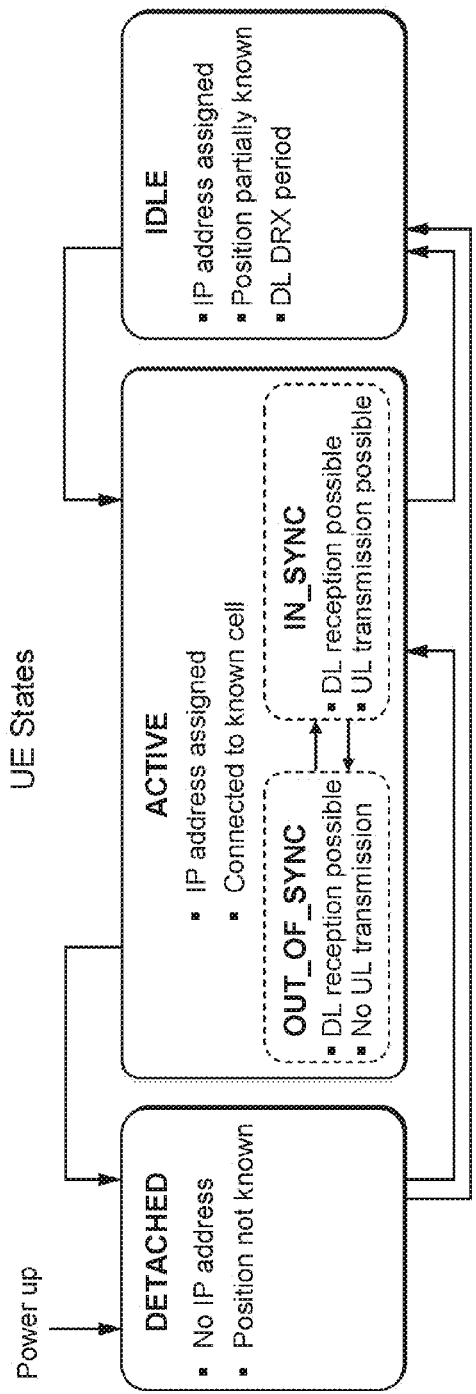
Figure 6

UPLINK SCRAMBLING DURING RANDOM ACCESS

PRIORITY APPLICATIONS

This application is a continuation of U.S. application Ser. No. 13/430,844, filed Mar. 27, 2012, which is a continuation of U.S. application Ser. No. 11/835,782, filed Aug. 8, 2007, now U.S. Pat. No. 8,169,992, the entire contents of each of which are hereby incorporated by reference.

TECHNICAL FIELD

The technical field relates to mobile radio communications, and in particular, to uplink communications involving mobile radio terminals in a mobile radio communications system.

BACKGROUND

Universal Mobile Telecommunications System (UMTS) is a 3rd Generation (3G) asynchronous mobile communication system operating in Wideband Code Division Multiple Access (WCDMA) based on European systems, Global System for Mobile communications (GSM) and General Packet Radio Services (GPRS). The Long Term Evolution (LTE) of UMTS is under development by the 3rd Generation Partnership Project (3GPP) which standardized UMTS. There are many technical specifications hosted at the 3GPP website relating to Evolved Universal Terrestrial Radio Access (E-UTRA) and Evolved Universal Terrestrial Radio Access Network (E-UTRAN), e.g., 3GPP TS 36.300. The objective of the LTE work is to develop a framework for the evolution of the 3GPP radio-access technology towards a high-data-rate, low-latency and packet-optimized radio-access technology. In particular, LTE aims to support services provided from the packet switched (PS)-domain. A key goal of the 3GPP LTE technology is to enable high-speed packet communications at or above about 100 Mbps.

FIG. 1 illustrates an example of an LTE type mobile communications system 10. An E-UTRAN 12 includes E-UTRAN NodeB (eNodeBs or eNBs) 18 that provide E-UTRA user plane and control plane protocol terminations towards the user equipment (UE) 20 over a radio interface. Although an eNB is a logical node, often but not necessarily implemented by a physical base station, the term base station is used here to generally cover both logical and physical nodes. A UE is sometimes referred to as a mobile radio terminal and in an idle state monitors system information broadcast by eNBs within range to inform itself about "candidate" base stations in the service area. When a UE needs access to services from a radio access network, it sends a request over a random access channel (RACH) to a suitable eNB, typically an eNB with the most favorable radio conditions. The eNBs are interconnected with each other by means of an X2 interface. The eNBs are also connected by means of the S1 interface to an Evolved Packet Core (EPC) 14 which includes a Mobility Management Entity (MME) by an S1-MME and to a System Architecture Evolution (SAE) Gateway by an S1-U. The MME/SAE Gateway are referenced as a single node 22 in this example. The S1 interface supports a many-to-many relation between MMEs/SAE Gateways and eNBs. The E-UTRAN 12 and EPC 14 together form a Public Land Mobile Network (PLMN). The MMEs/SAE Gateways 22 are connected to directly or indirectly to the Internet 16 and to other networks.

In order to enable operation in different spectrum allocations, for example to have a smooth migration from existing cellular systems to the new high capacity high data rate system in existing radio spectrum, operation in a flexible bandwidth is necessary, e.g., bandwidths ranging from 1.25 MHz to 20 MHz for downlink transmissions from network to UE. Both high rate data services low rate services like voice must be supported, and because 3G LTE is designed for TCP/IP, VoIP will likely be the service carrying speech.

LTE uplink transmission is based on so-called Discrete Fourier Transform Spread-OFDM (DFTS-OFDM) transmission, a low-peak to average power ratio (PAPR), single-carrier (SC) transmission scheme that allows for flexible bandwidth assignment and orthogonal multiple access not only in the time domain but also in the frequency domain. Thus, the LTE uplink transmission scheme is also often referred to as Single-Carrier FDMA (SC-FDMA).

The LTE uplink transport-channel processing is outlined in FIG. 2. A transport block of dynamic size is delivered from the media access control (MAC) layer. A cyclic redundancy code (CRC) to be used for error detection at the base station receiver is calculated for the block and appended thereto. Uplink channel coding is then performed by a channel encoder which may use any suitable coding technique. In LTE, the code may be a turbo code that includes a Quadratic Permutation Polynomial (QPP)-based internal interleaver for performing block interleaving as part of the turbocoder. The LTE uplink hybrid-Automatic Repeat Request (ARQ) extracts, from the block of coded bits delivered by the channel coder, the exact set of bits to be transmitted at each transmission/retransmission instant. A scrambler scrambles the coded bits on the LTE uplink (e.g., bit-level scrambling) in order to randomize the interference and thus ensure that the processing gain provided by the channel code can be fully utilized.

To achieve this randomization of the interference, the uplink scrambling is mobile terminal-specific, i.e., different mobile terminals (UEs) use different scrambling sequences. Terminal-specific scrambling also provides the scheduler the freedom to schedule multiple users on the same time-frequency resource and rely on base station receiver processing to separate the transmissions from the multiple users. Terminal-specific scrambling randomizes the interference from other mobile terminals in the same cell that happen to be scheduled on the same resource and improves the performance.

After scrambling, the data is modulated to transform a block of coded/scrambled bits into a block of complex modulation symbols. The set of modulation schemes supported for the LTE uplink example include QPSK, 16QAM, and 64QAM, corresponding to two, four, and six bits per modulation symbol, respectively. The block of modulation symbols is then applied to a DFTS-OFDM modulator, which also maps the signal to an assigned radio resource, e.g., a frequency sub-band.

Together with the modulated data symbols, the signal mapped to the assigned frequency band also contains demodulation reference signals. Reference signals known in advance by both the mobile terminal (UE) and the base station (eNodeB) and are used by the receiver for channel estimation and demodulation of the data symbols. Different reference signals can be assigned to a user terminal for similar reasons terminal-specific scrambling codes may be used, i.e., to intelligently schedule multiple users on the same time-frequency resource and thereby realize so-called multi-user MIMO. In case of multi-user MIMO, it is up to the eNodeB processing to separate the signals transmitted from the two (or more) UEs simultaneously scheduled on the same frequency resource in the same cell. Terminals simultaneously scheduled on the same frequency resource are typically assigned different (e.g., orthogonal) reference signal sequences in order for the eNodeB to estimate the radio channels to each of those UEs.

A basic requirement for any cellular or other radio communications system is providing a user terminal the capability to request a connection setup. This capability is commonly known as random access and serves two main purposes in LTE, namely, establishment of uplink synchronization with the base station timing and establishment of a unique user terminal identity, e.g., a cell radio network temporary identifier (C-RNTI) in LTE, known to both the network and the user terminal that is used in communications to distinguish the user's communication from other communications.

But during the (initial) random access procedure, uplink transmissions from the user terminal cannot employ terminal-specific scrambling sequences or reference numbers to randomize interference because the initial random access request message from the user terminal has just started communicating with the network and neither a terminal-specific scrambling code nor a terminal-specific reference number has been assigned to that user terminal. What is needed is a mechanism that permits random access messages sent over a shared uplink channel to be scrambled until a terminal-specific scrambling code can be assigned to the user terminal. One reason to scramble random access messages is to randomize inter-cell interference, which is also the case for scrambling during "normal" uplink data transmission. Scrambling can also be used to suppress intra-cell interference in case of multiple UEs being scheduled on the same time-frequency resource. Similarly, it would also be desirable for user terminals to transmit known reference signals during random access to allow the base station receiver to estimate the uplink channel. Reference signals need to be included in the random access messages as well as in "normal" uplink data transmissions to enable channel estimation at the eNodeB and corresponding coherent demodulation.

SUMMARY

The technology described below facilitates random access by a user terminal with a radio base station. A user terminal determines one of a first type of uplink scrambling sequences and generates a random access message using the determined one of the first type of uplink scrambling sequences. Its transmitter transmits the random access message to the radio base station. The user terminal receiver then receives from the base station a second different type of uplink scrambling sequence. The terminal uses that second different type of uplink scrambling sequence for subsequent communication with the radio base station. In one non-limiting example embodiment, the first type of uplink scrambling sequences may be specifically associated with the radio base station's cell area or a random access radio channel associated with the radio base station, but they are not specifically assigned to any user terminal, and the second different type of uplink scrambling sequence may be selected from a second set of uplink scrambling sequences specifically assignable to user terminals. Using these two different types of scrambling sequences permits user terminals to scramble their uplink signal transmissions even though terminal-specific scrambling codes cannot be used in the uplink during random access by user terminals.

The user terminal transmits a first random access request message including a random access preamble to the radio base station using a random access channel radio resource. A second random access response message is then received from the radio base station indicating a timing change, an identified radio resource, and a temporary user terminal identifier. The terminal adjusts a timing at the user terminal for transmitting signals to the radio base station based on information received in the random access response message, and based on the adjusted timing, transmits a third message corresponding to the generated random access message including the user's full terminal identity to the radio base station over the identified radio resource. The third message is scrambled using the determined one of the first type of uplink scrambling sequence, modulated, and mapped to a radio channel resource. The terminal receives a fourth contention resolution message from the radio base station to complete the random access procedures and normal communications follow.

Various non-limiting embodiments map the first set of uplink scrambling sequences to some other parameter known by the user terminal and the base station. For example, the first set of uplink scrambling sequences may be mapped to corresponding random access preamble sequences. One of the first set of uplink scrambling sequences may then be selected based on the random access preamble included in the first random access request message and the mapping. Another example maps the first set of uplink scrambling sequences to corresponding user terminal identifiers and selects one of the first set of uplink scrambling sequences based on the user terminal identifier included in the second random access response message and the mapping. A third example maps the first set of uplink scrambling sequences to corresponding radio resources used for transmitting the random access request message and selects one of the first set of uplink scrambling sequences based on the random access channel radio resource used to send a first random access request message including a random access preamble to the radio base station and the mapping.

The two type scrambling sequence approach also may be used for reference signals embedded in uplink random access messages sent to the base station which are used by the base station to estimate the uplink channel, e.g., for equalization purposes, etc. One of a first set of uplink reference sequences is selected, e.g., uplink reference sequences specifically associated with a radio base station's cell area or random access channel but which are not specifically assigned to any user terminal. A random access message is generated using the selected one of the first set of uplink scrambling sequences and the selected one of the first set of uplink reference sequences. The user terminal transmits the random access message to the radio base station. Thereafter, the base station informs the user terminal of a second different type of reference sequence to use in subsequent uplink communications, e.g., a reference number assigned specifically to that user terminal.

In one non-limiting example implementation, the user terminal and base station are configured to communicate with a long term evolution (LTE) radio communications network with the user terminal transmitting the first random access request message over a random access channel (RACH) and the third message over an uplink-shared channel (UL-SCH). The user terminal identifier sent by the base station in the second message may be a temporary user terminal identifier used until a radio network terminal identifier (RNTI) is assigned to the user terminal.

BRIEF DESCRIPTION OF THE DRAWINGS

FIGS. 5A and 5B illustrate a mapping between transport and physical channels in the downlink and uplink, respectively;

FIG. 6 is a diagram illustrating three basic states of a user terminal;

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

Figure 1:
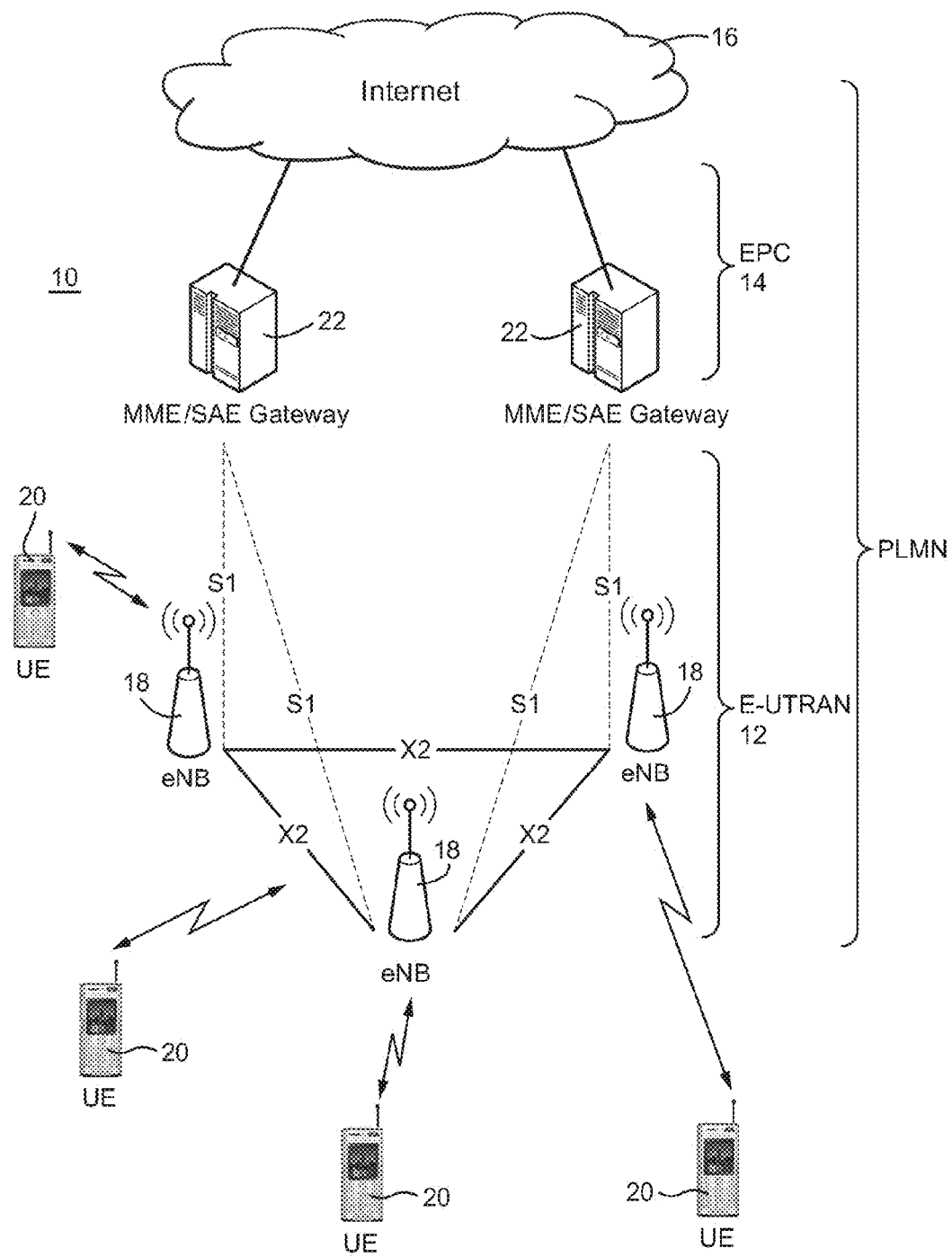
FIG. 1 an example LTE mobile radio communications system.

It will be apparent to one skilled in the art that other embodiments may be practiced apart from the specific details disclosed below. The technology is described in the context of an evolved 3GPP UMTS system such as LTE in order to provide an example and non-limiting context for explanation. See for example the LTE system diagram shown in FIG. 1. But this technology is not limited to LTE and may be used in any modern radio communications system. Moreover, the approach below which employs two different types of scrambling sequences—one for purposes of random access and one for communications after random access is completed—may also be applied to known channel estimation reference signals (sometimes called pilot signals). However, the detailed explanation is provided using scrambling sequences with the understanding that similar details apply to reference signals. For ease of description, a user equipment (UE) is often referred to without limitation as a user terminal or a mobile terminal, and an eNodeB is referred to using the more general and familiar term base station.

Figure 3:
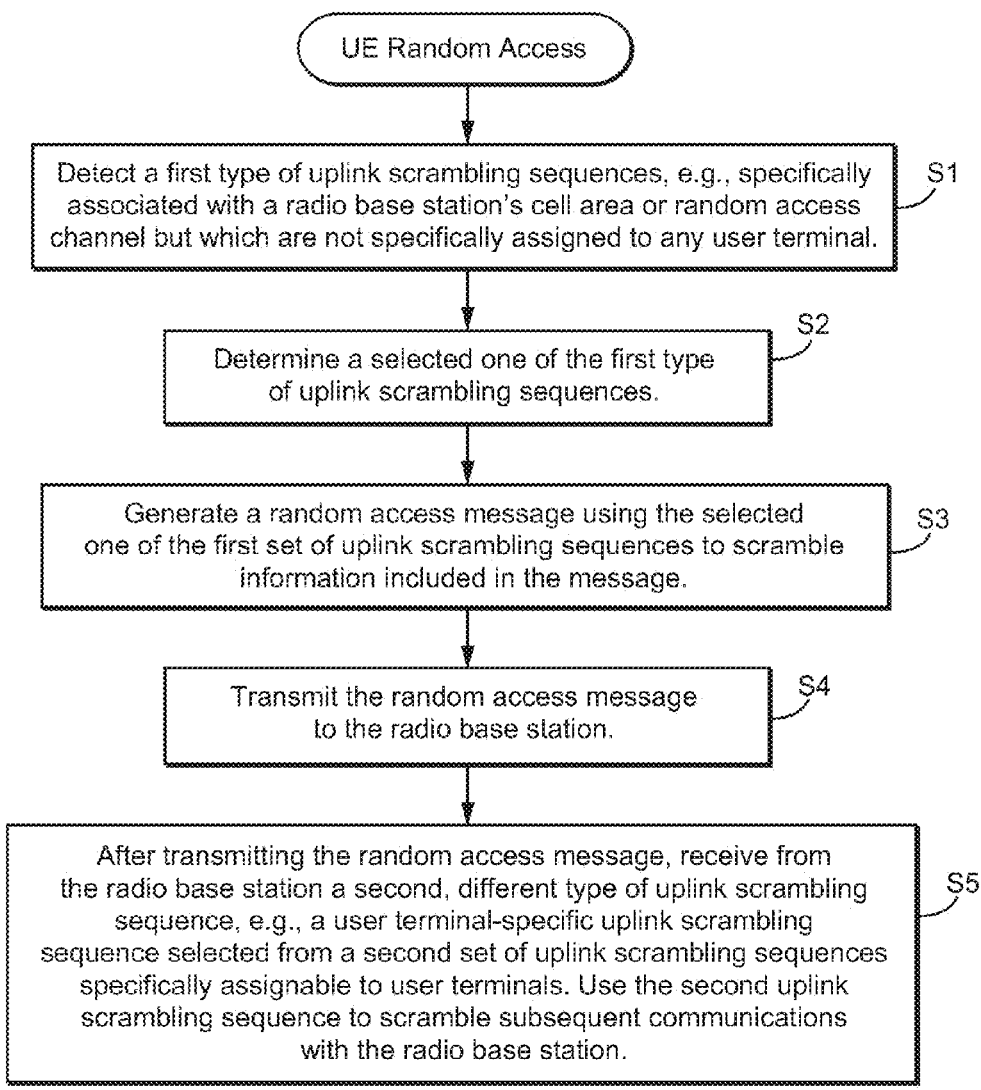
FIG. 3 is flow diagram illustrating non-limiting, example procedures for a user terminal to make a random access to the radio network.

FIG. 3 is flow diagram illustrating non-limiting, example procedures for a user terminal to make a random access to the radio network using an uplink scrambling code that is generally available to all user terminals desiring to randomly access service in a particular cell. The user terminal detects a first type of uplink scrambling sequences, e.g., uplink scrambling sequences specifically associated with a radio base station's cell area or random access channel but which are not specifically assigned to any user terminal (step S1). A selected one of the first type of uplink scrambling sequences is determined (step S2), and a random access message is generated using the selected one of the first type of uplink scrambling sequences (step S3). The user terminal transmits the random access message to the radio base station (step S4). After transmitting the random access message, the user terminal receives from the radio base station a second, different type of uplink scrambling sequence, e.g., an uplink scrambling sequence selected from a second set of uplink scrambling sequences specifically assignable to user terminals (step S5). The user terminal uses the second type of uplink scrambling sequence for subsequent communication with the radio base station. Similar procedures can be used for known uplink reference signals.

Figure 4:
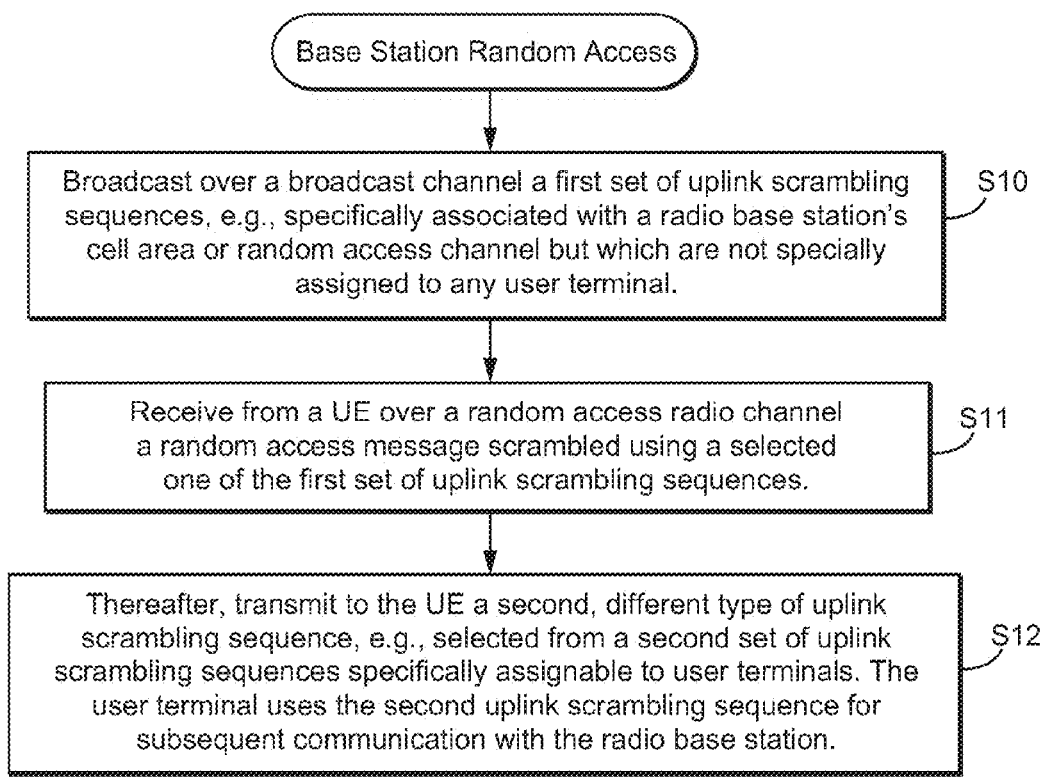
FIG. 4 is flow diagram illustrating non-limiting, example procedures for a base station to receive and process a user terminal's random access to the radio network.

FIG. 4 is flow diagram illustrating non-limiting, example counterpart procedures for a base station to receive and process a user terminal's random access to the radio network. Each base station in the network has its own set of preamble sequences, reference signals, and non-terminal specific scrambling codes or sequences. The base station broadcasts, implicitly or explicitly, over a broadcast channel, e.g., BCH, its set of preambles and uplink scrambling sequences (step S10). If the base station does not explicitly broadcast the scrambling sequence to use, the identity of the cell from which the scrambling sequence to use may be derived for example via a mapping between sequence and cell identifier. The uplink scrambling sequences may be, for example, specifically associated with a radio base station's cell area or random access channel and are not specifically assigned to any user terminal. The base station then waits to receive a first random access request message from a user terminal that includes one of the base station's preambles. In response, the base station transmits a second random access response message to the one user terminal indicating a timing change, an identified radio resource, and a user terminal identifier. A third message corresponding to the generated random access message that includes the user terminal identity is descrambled using the selected one of the first set of uplink scrambling sequences (step S11). Thereafter, the base station transmits to the user terminal a fourth message including a second different type of uplink scrambling sequence selected from a second set of uplink scrambling sequences, e.g., uplink scrambling sequences that are specifically assignable to user terminals (step S12). The user terminal uses the second uplink scrambling sequence for subsequent communication with the radio base station. Similar procedures can be applied for known uplink reference signals.

To better understand the following example and non-limiting LTE random access procedure, reference is made to FIGS. 5A and 5B which illustrate a mapping between transport and physical channels in the downlink and uplink, respectively. The following are downlink transport channels: the broadcast channel (BCH), the paging channel (PCH), the downlink shared channel (DL-SCH), and the multi-cast channel (MCH). The BCH is mapped to the Physical Broadcast Channel (PBCH), and the PCH and the DL-SCH are mapped to the Physical Downlink Shared Channel (PDSH). The uplink transport channels include the random access channel (RACH) and the uplink shared channel (UL-SCH).

The RACH maps to the Physical Random Access Channel (PRACH), and the UL-SCH maps to the Physical Uplink Shared Channel (PUSCH).

In LTE, as in other mobile radio communication systems, a mobile terminal can be in several different operational states. FIG. 6 illustrates those states for LTE. At power-up, the mobile terminal enters the LTE_DETACHED state. In this state, the mobile terminal is not known to the network. Before any further communication can take place between the mobile terminal and the network, the mobile terminal needs to register with the network using the random access procedure to enter the LTE_ACTIVE state. The LTE_DETACHED state is mainly a state used at power-up. Once the mobile terminal registers with the network, it is typically in one of the other states: LTE_ACTIVE or LTE_IDLE.

LTE_ACTIVE is the state used when the mobile terminal is active with transmitting and receiving data. In this state, the mobile terminal is connected to a specific cell within the network. One or several Internet Protocol (IP) or other type data packet addresses have been assigned to the mobile terminal, as well as an identity of the terminal, a Cell Radio Network Temporary Identifier (C-RNTI), used for signaling purposes between the mobile terminal and the network. The LTE_ACTIVE state includes two substates, IN_SYNC and OUT_OF_SYNC, depending on whether the uplink is synchronized to the network or not. As long as the uplink is in IN_SYNC, uplink transmissions of user data and lower layer control signaling are possible. If no uplink transmission has taken place within a given time window, the uplink is declared to be out-of-sync, in which case, the mobile terminal must perform a random access procedure to restore uplink synchronization.

LTE_IDLE is a low activity state in which the mobile terminal sleeps most of the time in order to reduce battery consumption. Uplink synchronization is not maintained, and hence, the only uplink transmission activity that may take place is random access to move to LTE_ACTIVE. The mobile terminal keeps its IP address(es) and other internal information in order to rapidly move to LTE_ACTIVE when necessary. The position of the mobile terminal is partially know to the network such that the network knows at least the group of cells in which paging of the mobile terminal is to be done.

Figure 7:
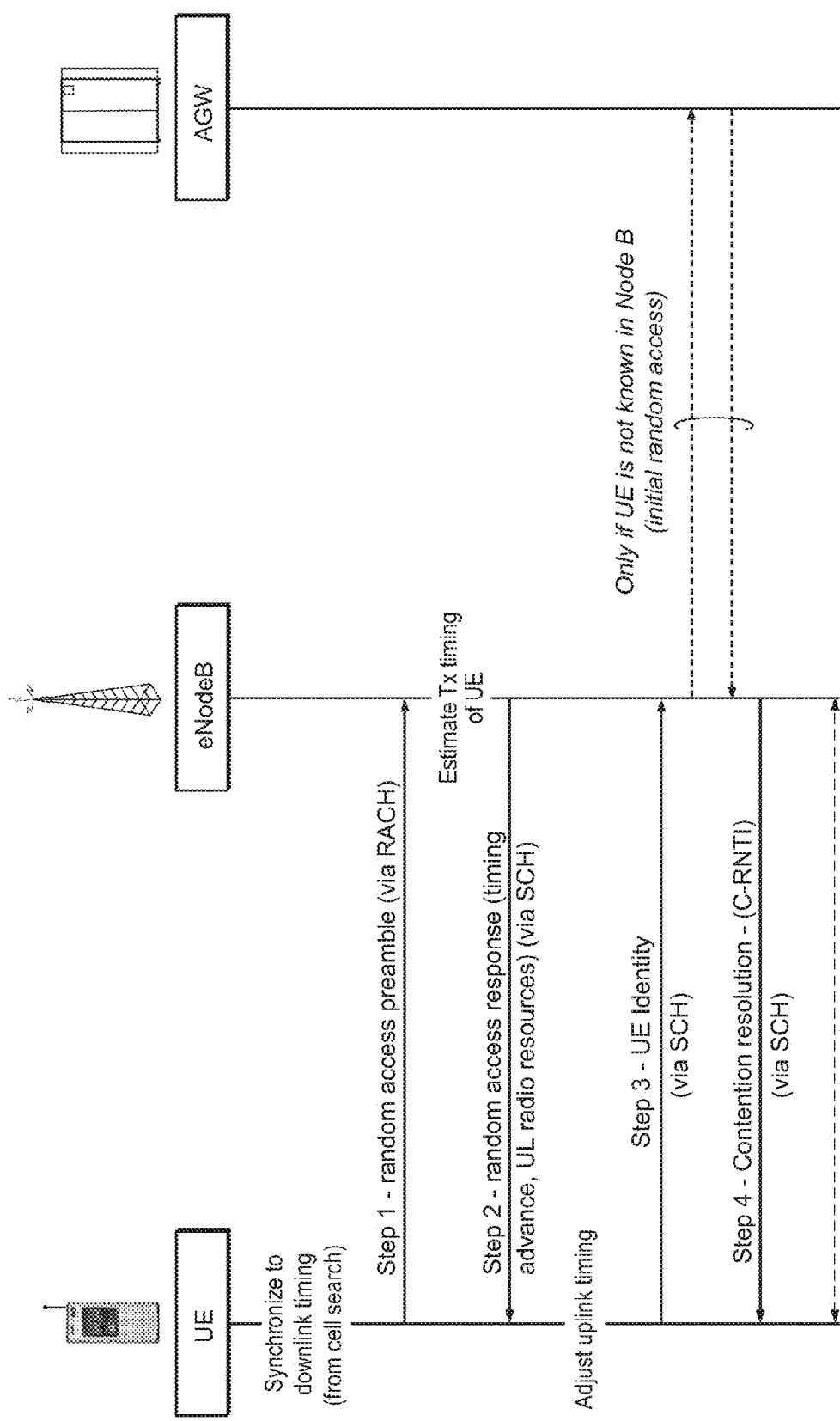
FIG. 7 is a signaling diagram illustrating a non-limiting example random access procedure.

A non-limiting example random access procedure is illustrated in FIG. 7 and includes four steps referred to as steps 1-4 with four associated signaling messages referred to as messages 1-4. The base station transmits a set of preambles associated with that base station, RACH resource information, and other information in a broadcast message sent regularly over a broadcast channel that active mobile terminals regularly scan. In step one, after the user terminal receives and decodes the information broadcast by the base station (eNodeB), selects one of the base station's random access preambles and transmits it over the RACH. The base station monitors the RACH and detects the preamble which allows the base station to estimate the transmission timing of the user terminal. Uplink synchronization is necessary in order to permit the terminal to transmit uplink data to the base station.

The random access preamble includes a known sequence, randomly selected by the mobile terminal from a set of known preamble sequences available for random access purposes with a particular base station. When performing a random access attempt, the terminal selects one preamble sequence at random from the set of preamble sequences allocated to the cell that the terminal is trying to access. As long as no other terminal is performing a random access attempt using the same preamble sequence at the same time instant, no collisions will occur, and the random access request will very likely be detected by the base station. The preamble is transmitted by a user terminal on a radio channel resource, e.g., a time/frequency resource, assigned for random access purposes, e.g., a RACH.

Figure 8:
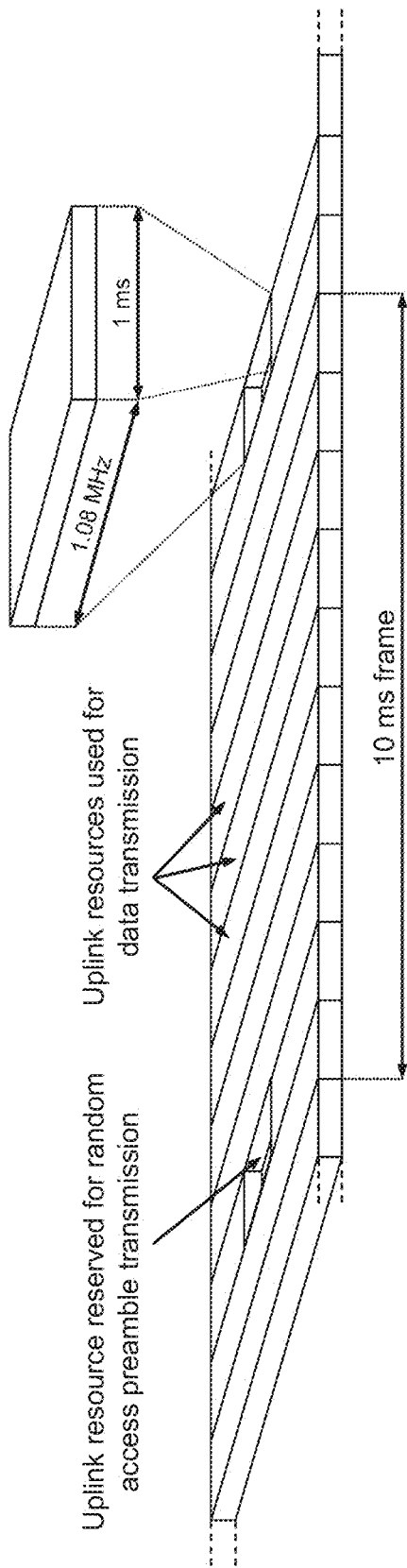
FIG. 8 illustrates a non-limiting example of a random access preamble transmission.
Figure 9:
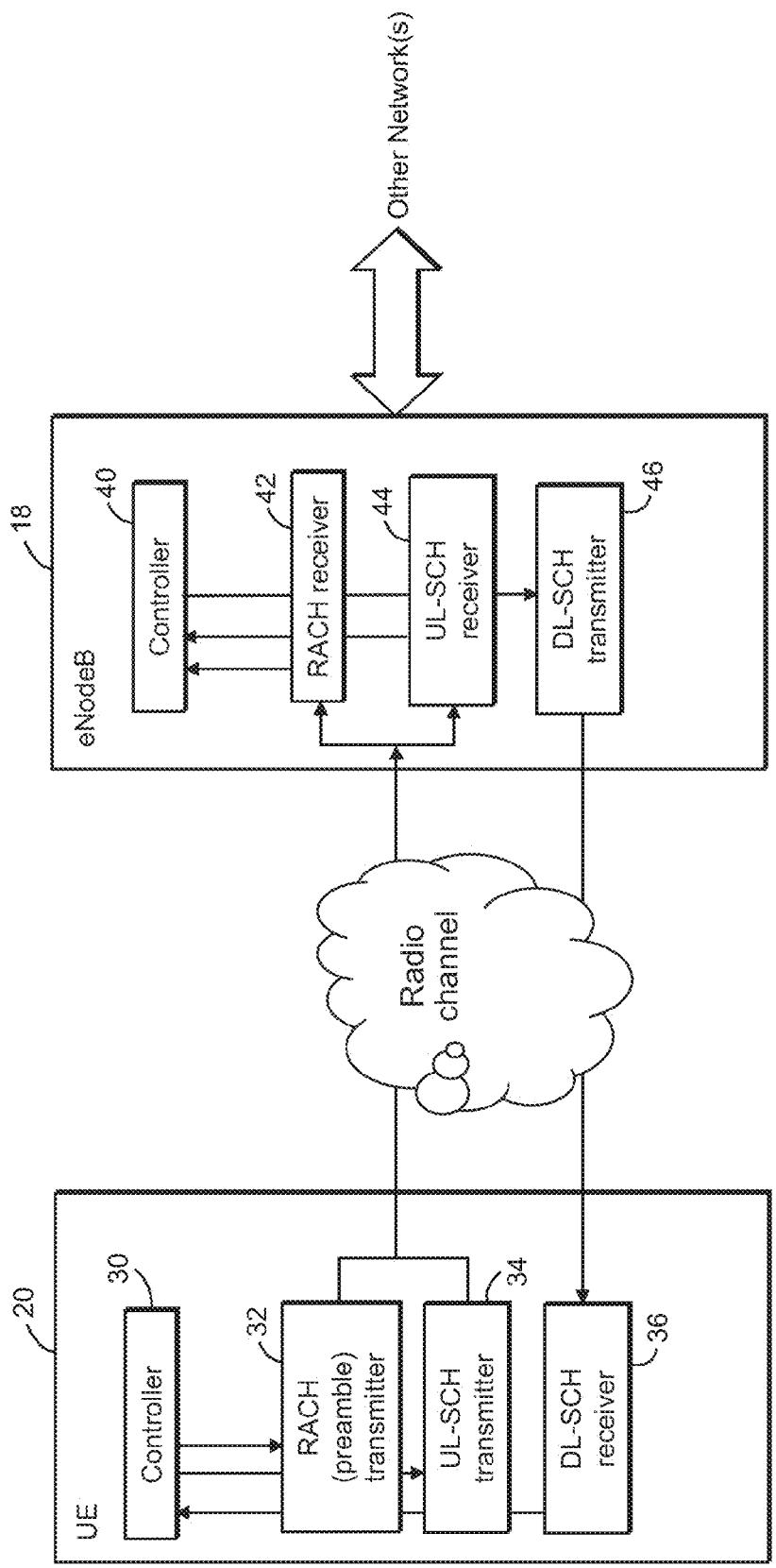
FIG. 9 is a non-limiting, example function block diagram of a user terminal and an eNode B base station.

FIG. 8 illustrates conceptually a random access preamble transmission according to the LTE specification as of this writing. One non-limiting example for generating suitable preambles is based on Zadoff-Chu (ZC) sequences and cyclic shifted sequences thereof. Zadoff-Chu sequences may also be used, for example, to create the uplink reference signals included in each data frame for channel estimation purposes.

A user terminal carrying out a random-access attempt has, prior to the transmission of the preamble, obtained downlink synchronization from a cell search procedure using timing information broadcast by the base station. But as explained above, the uplink timing is not yet established. The start of an uplink transmission frame at the terminal is defined relative to the start of the downlink transmission frame at the terminal. Due to the propagation delay between the base station and the terminal, the uplink transmission will be delayed relative to the downlink transmission timing at the base station. Because the distance between the base station and the terminal is not known, there is an uncertainty in the uplink timing corresponding to twice the distance between the base station and the terminal. To account for this uncertainty and avoid interference with subsequent subframes not used for random access, a guard time is used.

Returning to the second random access signaling step shown in FIG. 7, in response to the detected random access attempt, the base station transmits a random access request response message 2 on the downlink-shared channel (DL-SCH). Message 2 contains an index or other identifier of the random access preamble sequence the base station detected and for which the response is valid, an uplink timing correction or timing advance command calculated by the base station after processing the received random-access preamble, a scheduling grant indicating resources the user terminal shall use for the transmission of the message in the third message sent from the mobile terminal to the base station, and a temporary user terminal identity used for further communication between the user terminal and the base station. After step 2 is completed, the user terminal is time synchronized.

If the base station detects multiple random access attempts (from different user terminals), then the random access request response messages 2 to multiple mobile terminals can be combined in a single transmission. Therefore, the random access request response message 2 is scheduled on the DL-SCH and indicated on the Physical Downlink Control Channel (PDCCH) using a common identity reserved for random access response. The PDCCH is a control channel used to inform the terminal if there is data on the DL-SCH intended for that terminal and, if so, on which time-frequency resources to find the DL-SCH. All user terminals that transmitted a preamble monitor the PDCCH for a random access response transmitted using the predefined common identity used by the base station for all random access responses.

In the third step 3, the user terminal transmits the necessary information in message 3 to the network using the scheduled uplink resources assigned in the random access response message 2 and synchronized in the uplink. Transmitting the uplink message in step 3 in the same manner as "normal" scheduled uplink data, i.e., on the UL-SCH, instead of attaching it to the preamble in the first step, is beneficial for several reasons. First, the amount of information transmitted in absence of uplink synchronization should be minimized as the need for large guard time makes such transmissions relatively costly. Secondly, the use of a "normal" uplink transmission scheme for message transmission allows the grant size and modulation scheme to be adjusted to, for example, different radio conditions. Third, it allows for hybrid ARQ with soft combining for the uplink message which may be valuable, especially in coverage limited scenarios, as it allows relying on one or several retransmissions to collect sufficient energy for the uplink signaling to ensure a sufficiently high probability of successful transmission. The mobile terminal transmits its temporary mobile terminal identity, e.g., a temporary C-RNTI, in the third step to the network using the UL-SCH. The exact content of this signaling depends on the state of the terminal, e.g., whether it is previously known to the network or not.

As long as the terminals which performed random access at the same time use different preamble sequences, no collision occurs. But there is a certain probability of contention where multiple terminals use the same random access preamble at the same time. In this case, multiple terminals react to the same downlink response message in step 2 and a collision occurs in step 3. Collision or contention resolution is performed in step 4.

In step 4, a contention-resolution message is transmitted from the base station to the terminal on the DL-SCH. This step resolves the contention in case multiple terminals tried to access the system on the same resource, by identifying which user terminal that was detected in the third step. Multiple terminals performing simultaneous random access attempts using the same preamble sequence in step 1 listen to the same response message in the step 2, and therefore, have the same temporary user terminal identifier. So in step 4, each terminal receiving the downlink message compares the user terminal identity in the message with the user terminal identity they transmitted in the third step. Only a user terminal that observes a match between the identity received in the fourth step and the identity transmitted as part of the third step determines the random access procedure as successful. If the terminal is not yet assigned a C-RNTI, the temporary identity from the second step is promoted to the C-RNTI; otherwise, the user terminal keeps its already-assigned C-RNTI. Terminals which do not find a match with the identity received in the fourth step must restart the random access procedure from the first step.

As explained above, the user terminal identity included in message 3 is used as part of the contention resolution mechanism in the fourth step. Continuing in the LTE non-limiting example, if the user terminal is in the LTE_ACTIVE state, i.e., is connected to a known cell and therefore has a C-RNTI assigned, this C-RNTI is used as the terminal identity in the uplink message. Otherwise, a core network terminal identifier is used, and the base station needs to involve the core network prior to responding to the uplink message in step three.

In this non-limiting LTE example, only the first step uses physical layer processing specifically designed for random access. The last three steps use the same physical layer processing as for "normal" uplink and downlink data transmission, which simplifies the implementation of both the terminal and the base station. Because the transmission scheme used for data transmission is designed to ensure high spectral flexibility and high capacity, it is desirable to benefit from these features also when exchanging random access messages.

Figure 2:
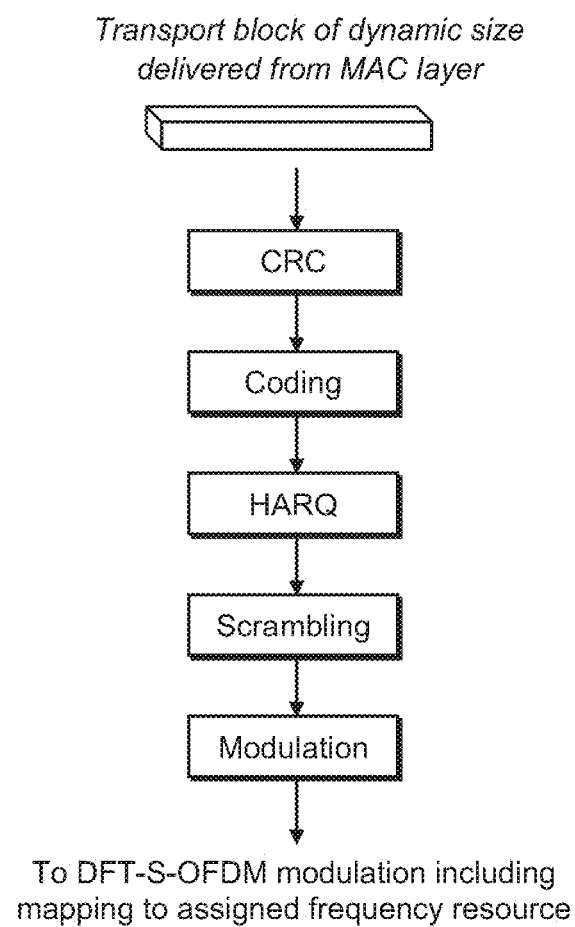
FIG. 2 is a flow diagram illustrating non-limiting, example procedures for preparing a transport block delivered from the media access layer of a user terminal for transmission over the radio interface to the network in an LTE mobile radio communications system.

In the example non-limiting LTE context, the general processing steps described in FIG. 2 including CRC, coding, HARQ, scrambling, modulation, and DFT-S-OFDM modulation are applied by the user terminal to message 3 in FIG. 7 and subsequent uplink transmissions from that user terminal to the base station (there is no scrambling in the initial uplink random access message in step 1). Different uplink scrambling sequences in the terminal depend on the type of uplink transmission. For the random access message 3, a first type of scrambling sequence is used, e.g., a cell-specific or random access channel-specific scrambling code. For subsequent "normal" data transmissions in the uplink, i.e., when the base station has assigned a non-temporary identity to the terminal, a second type of scrambling sequence is used, e.g., a terminal-specific scrambling code. A similar two-type approach may be used for uplink reference signals used by the base station for channel estimation: a first type, e.g., a cell- or random-access-specific reference signal for random access message 3, followed by a second type, e.g., a base station-assigned or associated uplink reference signal sequence for following "normal" data transmissions.

When the base station assigns a scrambling sequence and/or reference sequence to the mobile terminal, that terminal-specific scrambling sequence and/or reference sequence is(are) used for all subsequent uplink data transmissions for that particular uplink connection. The scrambling sequence and/or reference sequence to be used can either be explicitly configured in the mobile terminal or tied to the terminal identity (e.g., a C-RNTI) that the base station assigns to a mobile terminal.

In the above, the user terminal uses a cell-specific scrambling sequence to scramble message 3 because prior to performing random access, the user terminal has decoded the base station's/cell's broadcast information and therefore knows the identity of the cell it is accessing, the random access preambles associated with that cell, and cell-specific scrambling sequences and/or reference numbers. As long as multiple terminals performing random access at the same time are assigned different time/frequency resources for their respective uplink random access message 3, there is no interference between these users and the lack of inter-user randomization is not a problem.

In a non-limiting embodiment, a one-to-one mapping is introduced between the random access preamble sequence used in the random access request message sent in step 1 of FIG. 7 and the scrambling sequence used for scrambling the random access message sent in step 3. Because both the base station and the user terminal know the preamble used for the random access request message sent in step 1 by the time message 3 is to be transmitted, both know which scrambling sequence to use.

In another non-limiting embodiment, the base station assigns the scrambling sequence for the user terminal to use for scrambling message 3 as a part of the random access request response transmitted in step 2 of FIG. 7, (i.e., before the transmission of message 3). As one example, this may be done by establishing a one-to-one mapping between the temporary user identifier sent in message 2, e.g., a temporary C-RNTI, and the scrambling sequence to use.

Yet another non-limiting embodiment links the scrambling sequence to be used by the user terminal to scramble message 3 to the time-frequency resource(s) used by the user terminal to transmit the random access preamble (message 1). In this case, the scrambling sequence will be known to both the base station and the user terminal because both know the time-frequency resources used for the first random access request message. For this embodiment, the scrambling sequence will be shared between all user terminals transmitting a random access request preamble on the same time-frequency resource (s). But as long as all those terminals are assigned different time/frequency resources for their own random access message 3, there is no interference between these users and the lack of inter-user randomization is not a problem.

Combinations of one or more of the four different example embodiments may also be used. Again, the principles described in the above scrambling sequence example and the four embodiments may also be used to uplink reference numbers used for uplink channel estimation. In other words, one general or shared type of reference number may be used for uplink random access message 3, and another terminal specific type reference number may be used for subsequent uplink communications associated with the connection.

There may be situations when the user terminal already has been assigned a identity but will still need to perform a random access. One example is when the terminal registers with the network, but loses synchronization in the uplink, and consequently, needs to perform a random access attempt to regain uplink synchronization. Although the user terminal has an identity assigned, terminal-specific scrambling cannot be used for message 3 in this case as the network does not know why the terminal is performing the random access attempt until message 3 is received. As a result, a cell-associated scrambling sequence rather than an outdated terminal-specific scrambling sequence needs to be used.

Accordingly, the benefits of terminal-specific scrambling for normal data transmission are kept without impacting the functionality of the random access procedure. As described above, terminal-specific scrambling randomizes interference which improves uplink transmission performance and provides additional flexibility in the scheduling design.

Although various embodiments have been shown and described in detail, the claims are not limited to any particular embodiment or example. For example, although primarily described in terms of scrambling sequences, the two type approach described for random access scrambling sequences may also be used for determining reference signal sequences sent in each uplink frame which are used by the base station receiver for uplink channel estimation purposes. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method implemented in a user terminal for accessing a radio channel, the method comprises:
    transmitting a random access preamble using a random access channel radio resource;
    receiving a random access response message from the radio base station, wherein the random access response message indicates an identified radio resource and a temporary user terminal identifier indicating a scrambling sequence that is not specifically assigned to a user terminal;
    determining an uplink scrambling sequence based on the temporary user terminal identifier included in the random access response message;
    transmitting a message 3 to the radio base station, wherein the message 3 includes a user terminal identity that is different from the temporary user terminal identifier, and wherein the message 3 is transmitted over the identified radio resource, and wherein the message 3 is scrambled using the determined uplink scrambling sequence;
    receiving a contention-resolution message from the radio base station, which includes the user terminal identity; and
    transmitting a subsequent data transmission in the uplink scrambled with an uplink scrambling sequence based on the user terminal identity in the received contention-resolution message.

2. The method according to claim 1, wherein the user terminal communicates with a long term evolution radio communications network, and wherein the random access preamble is transmitted over a random access channel and wherein the message 3 is transmitted over an uplink-shared channel.

3. The method according to claim 1, wherein the random access response message further indicates a timing change and wherein the method further comprises:
    adjusting a timing at the user terminal for transmitting signals to the radio base station based on the timing change received in the random access response message; and
    wherein the message 3 is transmitted based on the adjusted timing.

4. The method according to Claim 1, wherein the temporary user terminal identifier is a Temporary Cell Radio Network Temporary identifier.

5. The method according to claim 1, wherein the user terminal identity is a Cell Radio Network Temporary Identifier.

6. The method according to claim 1, wherein determining an uplink scrambling sequence based on the temporary user terminal identifier included in the random access response message comprises:
    establishing a one-to-one mapping between the temporary user terminal identifier and the uplink scrambling sequence.

7. A method implemented in a base station associated with a cell for responding to user terminals requesting service from the base station over a radio channel, the method comprising:
    receiving a random access preamble over a random access channel radio resource;
    transmitting a random access response message to the user terminal, wherein the random access response message indicates an identified radio resource and a temporary user terminal identifier, wherein the temporary user terminal identifier indicates an uplink scrambling sequence that is not specifically assigned to the user terminal;
    receiving over the identified radio resource a message 3 from the user terminal including a user terminal identity that is different from the temporary user terminal identifier, wherein the message 3 is scrambled with an uplink scrambling sequence as indicated in the random access response message;

transmitting a contention-resolution message to the user terminal which includes the user terminal identity; and receiving a subsequent data transmission from the user terminal scrambled with an uplink scrambling sequence based on the user terminal identity in the transmitted contention-resolution message.

8. The method according to claim 7, wherein the base station is part of a long term evolution radio communications network, and wherein the random access preamble is received over a random access channel and wherein the message 3 is received over an uplink-shared channel.

9. The method according to claim 7, wherein the random access response message further indicates a timing change.

10. The method according to claim 7, wherein the temporary user terminal identifier is a temporary Cell Radio Network Temporary Identifier.

11. The method according to claim 7, wherein the user terminal identity is a Cell Radio Network Temporary Identifier.

12. A user terminal for requesting service from a base station having a cell area where the base station offers radio communications service, the user terminal comprising:

a radio transmitter configured to transmit a random access preamble using a random access channel radio resource;

a radio receiver configured to receive a random access response message from the radio base station, wherein the random access response message indicates an identified radio resource and a temporary user terminal identifier indicating a scrambling sequence that is not specifically assigned to a user terminal;

processing circuitry configured to determine an uplink scrambling sequence based on the temporary user terminal identifier included in the random access response message;

wherein the radio transmitter is configured to transmit a message 3 to the radio base station, wherein the message 3 includes a user terminal identity that is different from the temporary user terminal identifier, the message 3 is transmitted over the identified radio resource, and the message 3 is scrambled using the determined uplink scrambling sequence;

wherein the radio receiver is configured to receive a contention-resolution message from the radio base station, which includes the user terminal identity; and wherein the radio transmitter is configured to transmit a subsequent data transmission in the uplink scrambled with an uplink scrambling sequence based on the user terminal identity in the received contention-resolution message.

13. The user terminal according to claim 12, wherein the user terminal is configured to communicate with a long term evolution radio communications network, and wherein the radio transmitter is configured to transmit the random access preamble over a random access channel and the message 3 over an uplink shared channel.

14. The user terminal according to claim 12, wherein the random access response message further indicates a timing change, and wherein the processing circuitry is configured to adjust a timing at the user terminal for transmitting signals to the radio base station based on the timing change received in the random access response message, and wherein the radio transmitter is configured to transmit the message 3 based on the adjusted timing.

15. The user terminal according to claim 12, wherein the temporary user terminal identifier is a Temporary Cell Radio Network Temporary Identifier.

16. The user terminal according to claim 12, wherein the user terminal identity is a Cell Radio Network Temporary Identifier.

17. The user terminal according to claim 12, wherein the processing circuitry is configured to determine the uplink scrambling sequence by establishing a one-to-one mapping between the temporary user terminal identifier and the uplink scrambling sequence.

18. The user terminal according to claim 12, wherein the user terminal is configured to be assigned the user terminal identity prior to the transmission of the random access preamble.

19. The user terminal according to claim 12, wherein the radio transmitter is configured to transmit the message 3 over an uplink-shared channel.

20. The user terminal according to claim 19, wherein the user terminal is configured to apply to message 3 a cyclic redundancy check, coding, a hybrid-Automatic Repeat Request, or a Discrete Fourier Transform Spread Orthogonal frequency-division multiplexing modulation.

21. The user terminal according to claim 19, wherein the user terminal is configured to apply to message 3 a cyclic redundancy check, coding, a hybrid-Automatic Repeat Request, and a Discrete Fourier Transform Spread Orthogonal frequency-division multiplexing modulation.

22. The user terminal according to claim 12, wherein the radio receiver is configured to receive a random access response message over a downlink-shared channel.

23. The user terminal according to claim 12, wherein the radio receiver is further configured to receive over a broadcast channel an indication of a set of random access preambles.

24. The user terminal according to claim 23, wherein the processing circuitry is further configured to select the random access preamble from the set of random access preambles.

25. The user terminal according to claim 24, wherein the processing circuitry is configured to select the random access preamble from the set of random access preambles randomly.

26. The user terminal according to claim 25, wherein the radio transmitter is configured to transmit the random access preamble in a random access request message and to a radio base station.

27. A radio base station configured to be associated with a cell for responding to user terminals requesting service from the base station over a radio channel, comprising circuitry configured to:

receive a random access preamble over a random access channel radio resource;

transmit a random access response message to the user terminal, wherein the random access response message indicates an identified radio resource and a temporary user terminal identifier, and wherein the temporary user terminal identifier indicates an uplink scrambling sequence that is not specifically assigned to the user terminal;

receive from the user terminal over the identified radio resource a message 3 scrambled with the uplink scrambling sequence, wherein the message 3 includes a user terminal identity that is different from the temporary user terminal identifier;

transmit a contention-resolution. message to the user terminal, which includes the user terminal identity; and receive a subsequent data transmission from the user terminal scrambled with an uplink scrambling sequence based on the user terminal identity in the transmitted contention-resolution message.

28. The radio base station according to claim 27, wherein the base station is part of a long term evolution radio communications network, and wherein the circuitry is configured to receive the random access preamble over a random access channel and the message 3 over an uplink shared channel.

29. The radio base station according to claim 27, wherein the random access response message further indicates a timing change.

30. The radio base station according to claim 27, wherein the temporary user terminal identifier is a Temporary Cell Radio Network Temporary Identifier.

31. The radio base station according to claim 27, wherein the user terminal identity is a Cell Radio Network Temporary Identifier.

* * * * *

UNITED STATES PATENT AND TRADEMARK OFFICE
CERTIFICATE OF CORRECTION

PATENT NO. : 9,949,239 B2
APPLICATION NO. : 14/244580
DATED : April 17, 2018
INVENTOR(S) : Parkvall et al.

It is certified that error appears in the above-identified patent and that said Letters Patent is hereby corrected as shown below:

In Fig. 4, Sheet 4 of 8, for Step "S10", in Line 3, delete "specially" and insert -- specifically --, therefor.

In Column 1, Line 7, delete "2012," and insert -- 2012, now Pat. No. 8,717,996, --, therefor.

In Column 5, Line 3, delete "an" and insert -- is an --, therefor.

In Column 5, Line 10, delete "is" and insert -- is a --, therefor.

In Column 5, Line 13, delete "is" and insert -- is a --, therefor.

In Column 5, Line 65, delete "is" and insert -- is a --, therefor.

In Column 6, Line 22, delete "is" and insert -- is a --, therefor.

In Column 6, Line 65, delete "(PDSH)." and insert -- (PDSCH). --, therefor.

In Column 8, Line 62, delete "the third step 3," and insert -- step 3, --, therefor.

In Column 11, Line 19, delete "a identity" and insert -- an identity --, therefor.

In Column 12, Line 39, in Claim 4, delete "Claim 1," and insert -- claim 1, --, therefor.

In Column 12, Line 41, in Claim 4, delete "identifier." and insert -- Identifier. --, therefor.

In Column 14, Line 66, in Claim 27, delete "contention-resolution." and insert -- contention-resolution --, therefor.

Signed and Sealed this
Fourth Day of December, 2018

Andrei Iancu
*Director of the United States Patent and Trademark Office*